(12) United States Patent
Mitchell

(10) Patent No.: US 11,454,538 B1
(45) Date of Patent: Sep. 27, 2022

(54) CALIBRATION DEVICES AND TECHNIQUES USING A RADIOMETRIC TRANSFORMATION APPLIED TO A MEASUREMENT PROVIDING FOR A SIMULATED MEASUREMENT

(71) Applicant: Wavefront Research, Inc., Northampton, PA (US)

(72) Inventor: Thomas A. Mitchell, Arrington, TN (US)

(73) Assignee: Wavefront Research, Inc., Northhampton, PA (US)

( * ) Notice: Subject to any disclaimer, the term of this patent is extended or adjusted under 35 U.S.C. 154(b) by 0 days.

(21) Appl. No.: 17/006,413

(22) Filed: Aug. 28, 2020

Related U.S. Application Data

(60) Provisional application No. 62/892,911, filed on Aug. 28, 2019.

(51) Int. Cl.
*G01J 1/02* (2006.01)
*G02B 27/10* (2006.01)

(52) U.S. Cl.
CPC ............ *G01J 1/0295* (2013.01); *G02B 27/10* (2013.01)

(58) Field of Classification Search
CPC .............................. G01J 1/0295; G02B 27/10
See application file for complete search history.

(56) References Cited

U.S. PATENT DOCUMENTS

| | | | |
|---|---|---|---|
| 5,262,635 A * | 11/1993 | Curbelo | G01N 21/274 250/214 A |
| 7,675,490 B2 * | 3/2010 | Cok | G09G 3/3208 315/169.3 |
| 10,024,720 B1 | 7/2018 | Mitchell | |
| 10,139,638 B1 | 11/2018 | Mitchell | |
| 10,288,892 B1 | 5/2019 | Mitchell | |
| 10,386,239 B1 | 8/2019 | Mitchell | |
| 2017/0339354 A1 * | 11/2017 | Mitchell | H04N 17/002 |

* cited by examiner

*Primary Examiner* — Jennifer D Bennett
(74) *Attorney, Agent, or Firm* — Culhane Meadows PLLC; Orlando Lopez

(57) ABSTRACT

An alternate calibration device and method for calibration of optical sensors having a reduced size, weight, and power (SWaP) as well as increasing the sensors modularity and potentially improving the accuracy and stability of its radiometric calibration.

9 Claims, 20 Drawing Sheets

$$C_{OUT} - C_{STV} = \mathbf{C} = [TN_o + \varepsilon \mathbf{N}_A]\tau R = mN_o + b$$

$$m = T\tau R$$
$$b = \varepsilon \mathbf{N}_A \tau R$$

where
- $C_{OUT}$ is the raw output of the sensor;
- $C_{STV}$ is the starvation level of the sensor;
- $\mathbf{C}$ is the relative output of the sensor;
- $T$ is the throughput of the sensor;
- $N_o$ is the radiance of the object;
- $\varepsilon$ is the integrated emissivity of background contributors;
- $\mathbf{N}_A$ is the radiance of an ambient temperature blackbody source;
- $\tau$ is the integration time; and
- $R$ is the responsivity of the sensor.

Figure 9

CALIBRATION DEVICES AND TECHNIQUES USING A RADIOMETRIC TRANSFORMATION APPLIED TO A MEASUREMENT PROVIDING FOR A SIMULATED MEASUREMENT

CROSS-REFERENCE TO RELATED APPLICATIONS

This application claims priority of U.S. Provisional Application Ser. 62/892,911, filed Aug. 28, 2019, entitled: CALIBRATION DEVICES AND TECHNIQUES, which is incorporated herein by reference in its entirety for all purposes whatsoever.

STATEMENT OF GOVERNMENT INTEREST

This invention was made with U.S. Government support from the U.S. Army under contract W909MY-12-D-0008/0013, subcontract PO 16119. The U.S. Government has certain rights in the invention.

SUMMARY OF THE INVENTION

The embodiments of the present invention provide an alternate calibration device and method for calibration of optical sensors having a reduced size, weight, and power (SWaP) as well as increasing the sensors modularity and potentially improving the accuracy and stability of its radiometric calibration.

For a better understanding of the present invention, together with other and further objects thereof, reference is made to the accompanying drawings and detailed description.

BRIEF DESCRIPTION OF THE DRAWINGS

FIG. 9 is a general equation for a calibration method of the present invention;

DETAILED DESCRIPTION

Figure 1A:
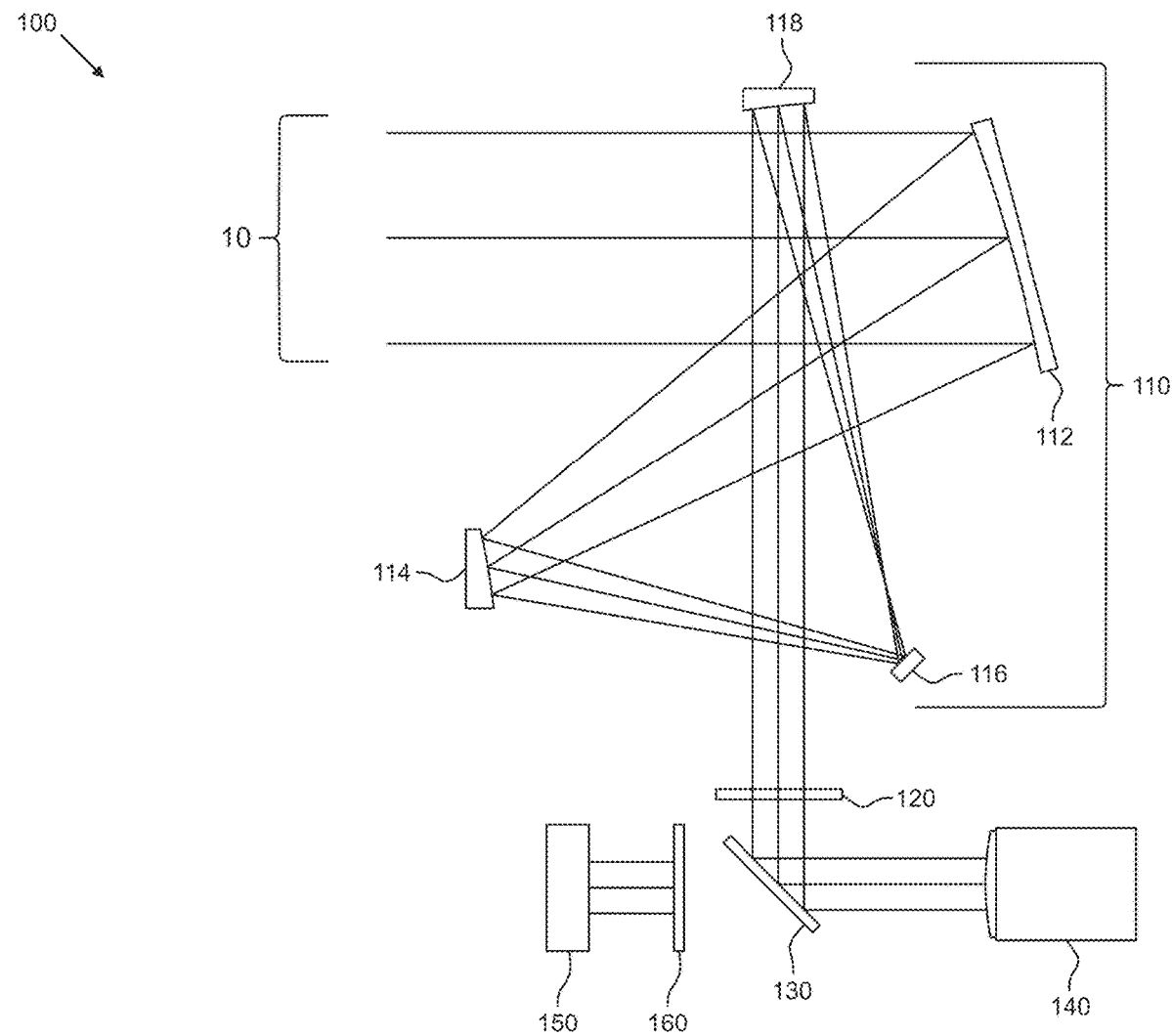
FIG. 1A is a schematic view of an embodiment of the present invention, shown in a first configuration.

This invention relates to calibration devices and techniques that provide benefits over existing designs, including, but not limited to, providing a more controlled or more accurate calibration, or a more compact sensor packaging, or a reduced combined sensor weight, or a reduced power consumption, or greater modularity, or any number of other benefits including various combinations of these benefits.

As the desire for more compact sensors increases with the success and availability of unmanned airborne vehicles (UAVs) as well as the need for high-fidelity man-portable sensors in the field, there is an increased need for more compact calibration devices and techniques that reduce the size, weight, and power requirements for sensors while simultaneously maintaining or improving their high-fidelity performance.

Radiometric transform," as used herein, is a linear transform between two spaces or modules (see, for example, "Linear Map" in Wikipedia, available at en.wikipedia.org/wiki/Linear_map.). In one embodiment, the linear transformation has both a linear (ratio) term and an offset (bias) term.

For example, consider some applications of hyperspectral imaging in which it is desirable to have a spectrometer that is intended to identify targets by their spectral signatures in the combined visible and infrared portions of the electromagnetic spectrum, but must also be very small size and mass so that the system can be transported in an unmanned aerial vehicles (UAV) or be man-portable. The accurate identification of targets requires accurate radiometric calibration of the sensor, which often requires in-flight or in-field calibration, particularly in the infrared spectrum. This calibration typically requires the use of external calibration sources, including larger, high-power radiance source and reflectance panels in the visible spectrum and large well-controlled thermal sources in the infrared spectrum. With the desire for smaller and smaller ground-sampling distances (GSDs) required, larger sensor apertures are typically necessary, requiring even larger calibration sources and panels, which in turn require more size, weight, and power (SWaP). Although there are some trades that can be made to reduce this overall SWaP, it typically introduces some loss in radiometric accuracy, thereby reducing the sensitivity of the sensor, and allowing potential targets and threats to go unidentified.

In addition, as the need to repurpose sensors for various platforms and missions, it is often necessary to change the front telescope optics to provide a different instantaneous field of view (IFOV) or ground-sample distance (GSD). For sensors with external calibration devices, changing the front telescope optics often requires a change or redesign in the external calibration equipment as well. The embodiments of the present invention described herein provide an internal calibration device that does not share an optical path with the front telescope optics and therefore would not need to be modified. This can significantly increase the modularity of the sensor as well as reduce the associated cost with repurposing the sensor.

By introducing a secondary radiometric source, typically located internal to the sensor, the SWaP of the calibration device can be kept much lower since these calibration sources are no longer located at the larger entrance pupil of the sensor. However, because the optical path of these radiometric calibration sources are typically different from the optical path of the collected imagery, a method of calibration transformation or correction is typically required.

Reference is made to FIG. 1A, which is a schematic view of an embodiment of the present invention, in a first configuration 100. In operation, electromagnetic radiation, typically in the ultraviolet, visible, and/or infrared bands, hereinafter referred to generally as light 10, emitted or reflected by a first object, either real or virtual, hereinafter referred to generally as a source (not shown), located at the object plane (not shown), is incident upon a first optical subsystem 110, in this embodiment made up of, but not limited to, four reflective elements 112, 114, 116, and 118, such as, but not limited to, mirrors, which is capable of substantially receiving a portion of the light from the first source 10. The first optical subsystem 110 is capable of substantially directing a portion of the light from the first source 10 to a beam splitting device 130, such as, but not limited to, a dichroic or filter window, prism, or other device capable of directing at least two portions of light in substantially different directions. A first configurable aperture device 120, such as, but not limited to, a shutter, iris, mechanical door, flip mirror, or other means by which to substantially allow a portion of the light from the first source 10 to be incident upon the beam splitting device 130 in a first configuration and substantially block or redirect a portion of the light from the first source 10 from being incident upon the beam splitting device 130 in a second configuration, is optically disposed along the optical path, in this embodiment between the first optical subsystem 110 and the beam splitting device 130, but in principal can be located at any position along the optical path between the first source and the beam splitting device 130. In this first configuration 100, the first configurable aperture device 120 is configured to substantially allow a portion of the light from the first source 10 to be incident upon the beam splitting device 130, which is capable of substantially receiving a portion of the light from the first optical subsystem 110 and is substantially capable of directing a portion of this light to a second optical subsystem 140, which can be made of any number of optical elements, either reflective, refractive, catadioptric, diffractive, or otherwise, and in general is any optical subsystem, which is capable of substantially receiving a portion of the light from the first optical subsystem.

Light emitted or reflected by a second source 150, which is substantially located along an optical path substantially separate from the first source, is also incident upon the beam splitting device 130. A second configurable aperture device 160, such as, but not limited to, a shutter, iris, mechanical door, flip mirror, or other means by which to substantially allow a portion of the light from the second source 150 to be incident upon the beam splitting device 130 in a first configuration and substantially block or redirect a portion of the light from the second source 150 from being incident upon the beam splitting device 130 in a second configuration, is optically disposed along the optical path, in this embodiment between the second source 150 and the beam splitting device 130. In this first configuration 100, the second configurable aperture device 160 is configured to substantially block or redirect a portion of the light from the second source 150 from being incident upon the beam splitting device 130. In one instance, the first source is a blackbody source. In another instance, k the second source is a blackbody source.

Figure 1B:
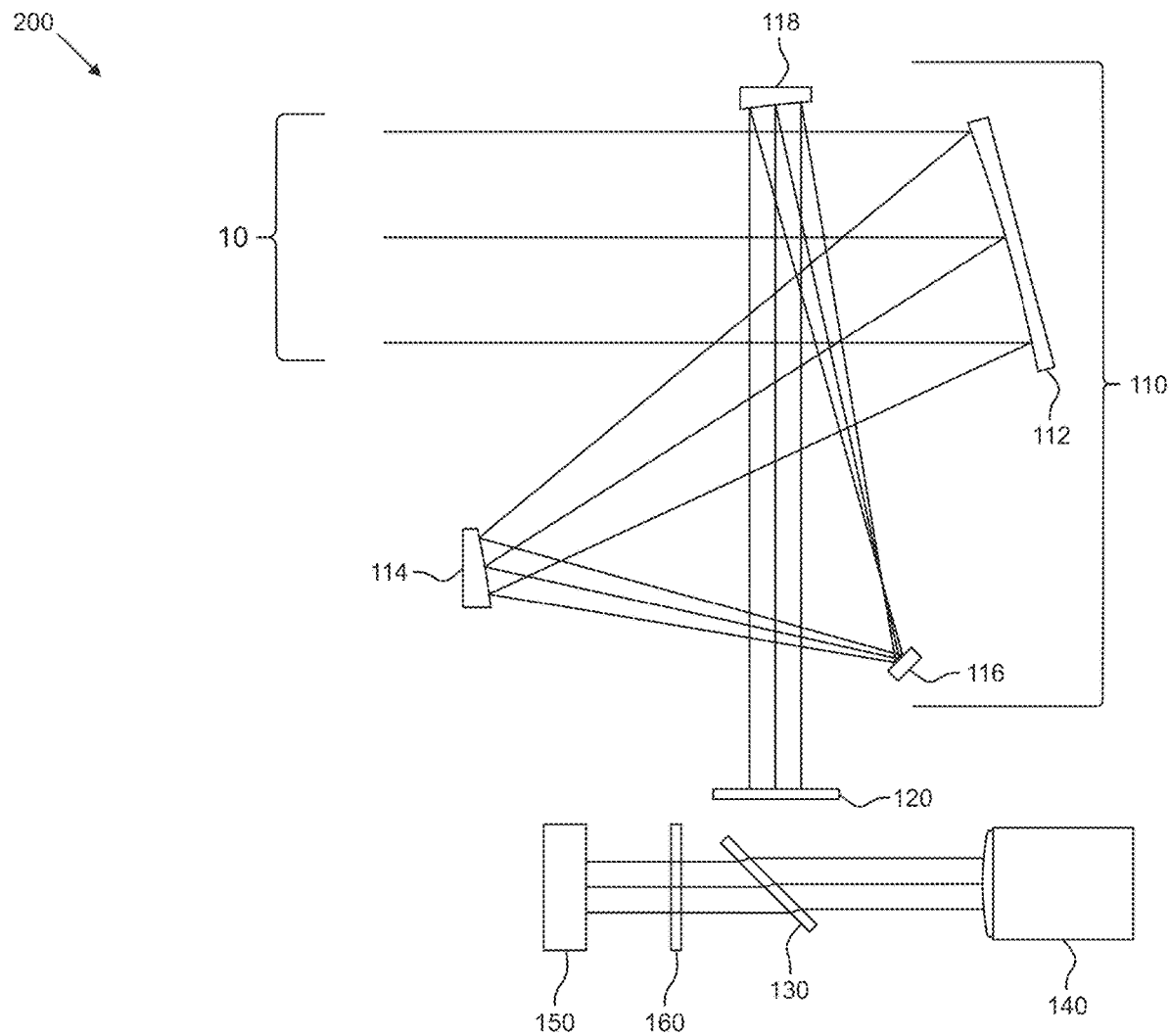
FIG. 1B is a schematic view of the embodiment of the present invention illustrated in FIG. 1A, shown in a second configuration.

Reference is made to FIG. 1B, which is a schematic view of the embodiment of the present invention illustrated in FIG. 1A, in a second configuration 200. In operation, light 10, emitted or reflected by the first source (not shown), located at the object plane (not shown), is incident upon the first optical subsystem 110, in this embodiment made up of, but not limited to, four reflective elements 112, 114, 116, and 118, such as, but not limited to, mirrors, which is capable of substantially receiving a portion of the light from the first source 10 and substantially directing a portion of the light from the first source 10 to the beam splitting device 130. In this second configuration 200, the first configurable aperture device 120 is configured to substantially block or redirect a portion of the light from the first source 10 from being incident upon the beam splitting device 130. The second source 150, which is substantially located along an optical path substantially separate from the first source, is optically disposed and configured such that light from the second source 150 is also incident upon the beam splitting device 130. In this second configuration 200, the second configurable aperture device 160 is configured to substantially allow a portion of the light from the second source 150 to be incident upon the beam splitting device 130, which is capable of substantially receiving a portion of the light from the second source 150 and is substantially capable of directing a portion of this light to the second optical subsystem 140, which is capable of substantially receiving a portion of the light from the first optical subsystem.

Figure 2A:
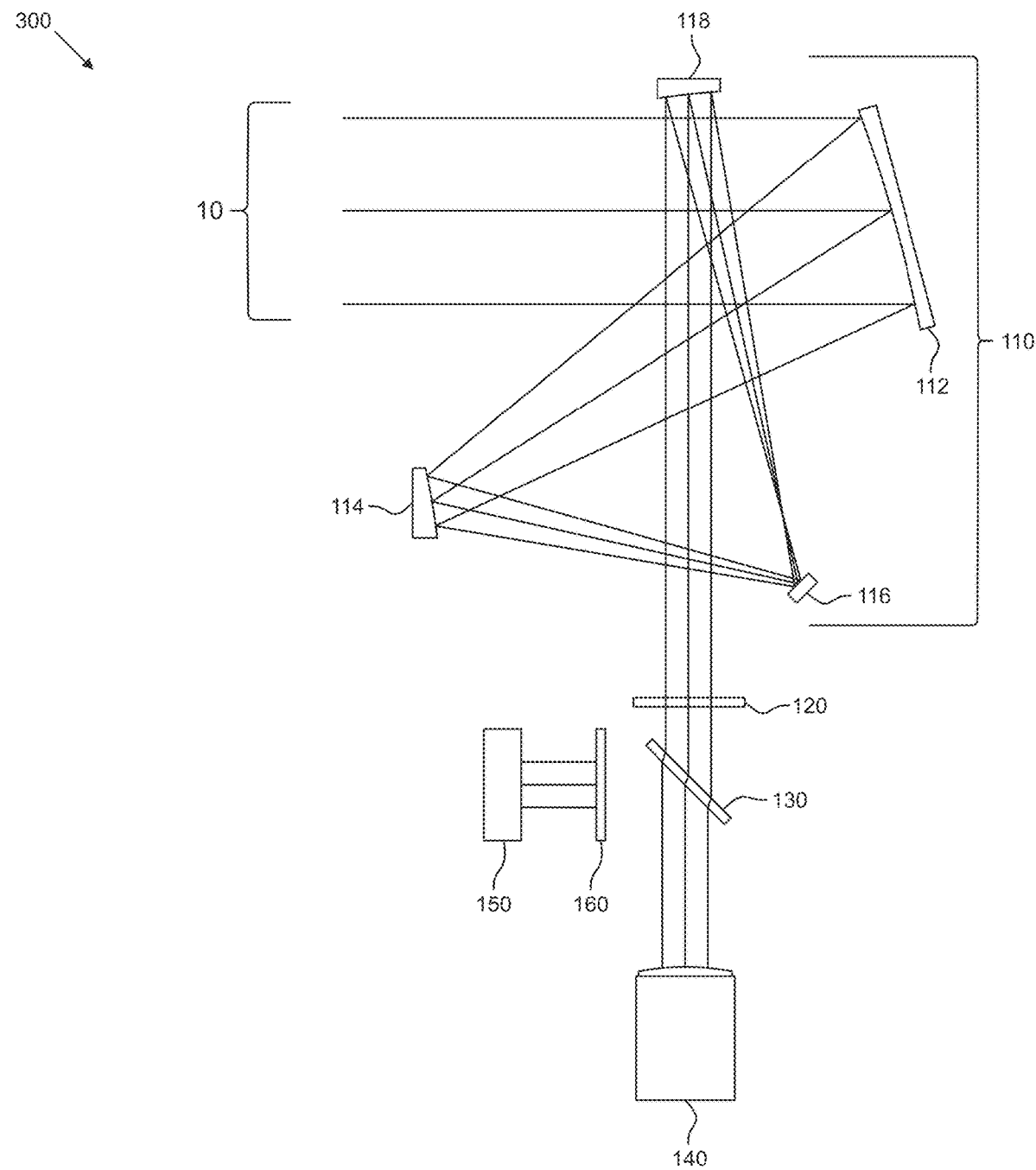
FIG. 2A is a schematic view of another embodiment of the present invention, shown in a first configuration.

Reference is made to FIG. 2A, which is a schematic view of an embodiment of the present invention, in a first configuration 300. In operation, light 10, emitted or reflected by a first source (not shown), located at the object plane (not shown), is incident upon a first optical subsystem 110, in this embodiment made up of, but not limited to, four reflective elements 112, 114, 116, and 118, such as, but not limited to, mirrors, which is capable of substantially receiving a portion of the light from the first source 10. The first optical subsystem 110 is capable of substantially directing a portion of the light from the first source 10 to a beam splitting device 130, such as, but not limited to, a dichroic or filter window, prism, or other device capable of directing at least two portions of light in substantially different directions. A first configurable aperture device 120, such as, but not limited to, a shutter, iris, mechanical door, flip mirror, or other means by which to substantially allow a portion of the light from the first source 10 to be incident upon the beam splitting device 130 in a first configuration and substantially block or redirect a portion of the light from the first source 10 from being incident upon the beam splitting device 130 in a second configuration, is optically disposed along the optical path, in this embodiment, between the first optical subsystem 110 and the beam splitting device 130, but in principle can be located at any position along the optical path between the first source and the beam splitting device 130. In this first configuration 300, the first configurable aperture device 120 is configured to substantially allow a portion of the light from the first source 10 to be incident upon the beam splitting device 130, which is capable of substantially receiving a portion of the light from the first optical subsystem 110 and is substantially capable of directing a portion of this light to a second optical subsystem 140, which can be made of any number of optical elements, either reflective, refractive, catadioptric, diffractive, or otherwise, and in general is any optical subsystem, which is capable of substantially receiving a portion of the light from the first optical subsystem.

Light emitted or reflected by a second source 150, which is substantially located along an optical path substantially separate from the first source, is also incident upon the beam splitting device 130. A second configurable aperture device 160, such as, but not limited to, a shutter, iris, mechanical door, flip mirror, or other means by which to substantially allow a portion of the light from the second source 150 to be incident upon the beam splitting device 130 in a first configuration and substantially block or redirect a portion of the light from the second source 150 from being incident upon the beam splitting device 130 in a second configuration, is optically disposed along the optical path, in this embodiment between the second source 150 and the beam splitting device 130. In this first configuration 300, the second configurable aperture device 160 is configured to substantially block or redirect a portion of the light from the second source 150 from being incident upon the beam splitting device 130.

Figure 2B:
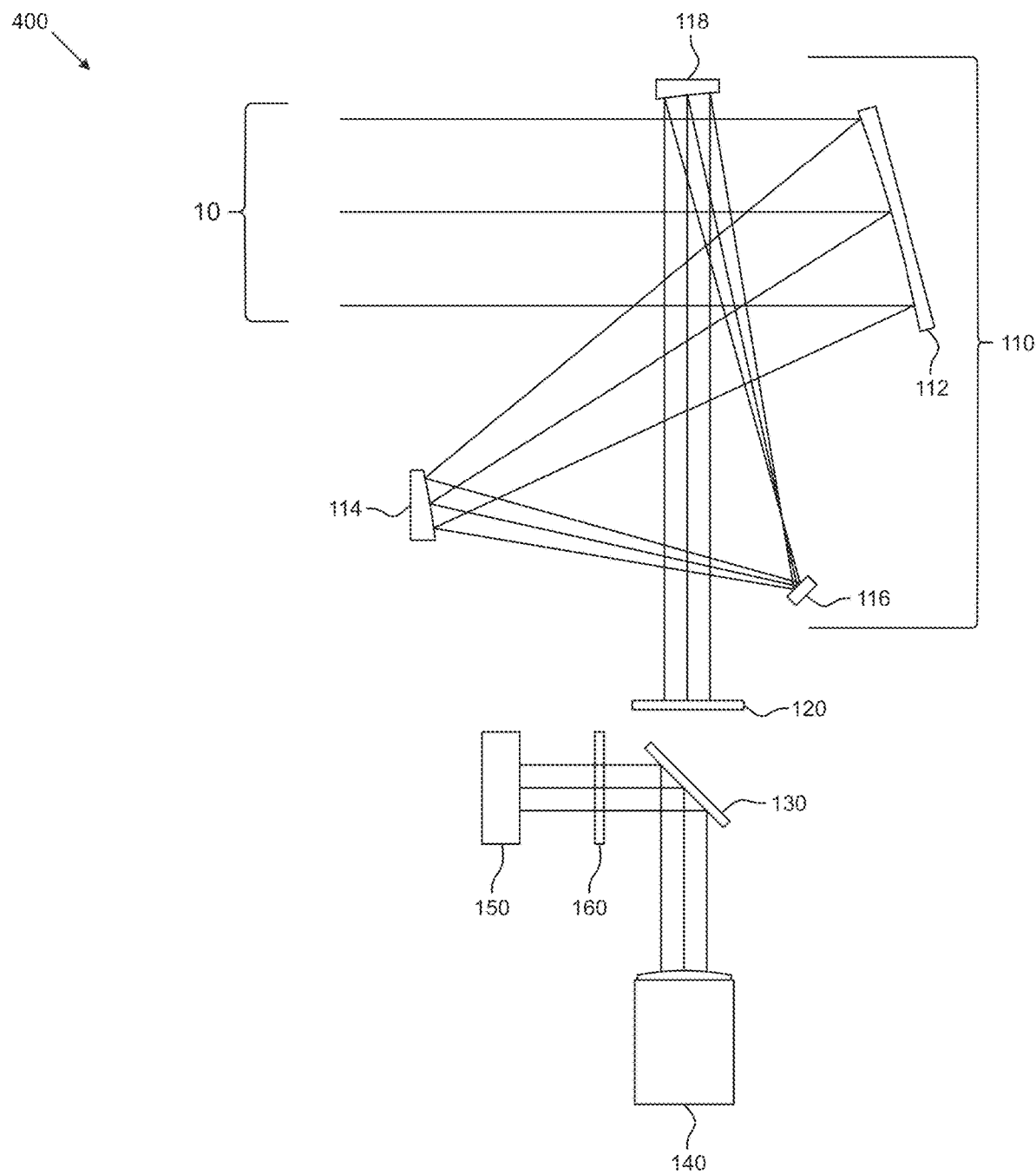
FIG. 2B is a schematic view of the embodiment of the present invention described in FIG. 2A, shown in a second configuration.

Reference is made to FIG. 2B, which is a schematic view of the embodiment of the present invention illustrated in FIG. 2A, in a second configuration 400. In operation, light 10, emitted or reflected by the first source (not shown), located at the object plane (not shown), is incident upon the first optical subsystem 110, in this embodiment made up of, but not limited to, four reflective elements 112, 114, 116, and 118, such as, but not limited to, mirrors, which is capable of substantially receiving a portion of the light from the first source 10 and substantially directing a portion of the light from the first source 10 to the beam splitting device 130. In this second configuration 400, the first configurable aperture device 120 is configured to substantially block or redirect a portion of the light from the first source 10 from being incident upon the beam splitting device 130. The second source 150, which is substantially located along an optical path substantially separate from the first source, is optically disposed and configured such that light from the second source 150 is also incident upon the beam splitting device 130. In this second configuration 400, the second configurable aperture device 160 is configured to substantially allow a portion of the light from the second source 150 to be incident upon the beam splitting device 130, which is capable of substantially receiving a portion of the light from the second source 150 and is substantially capable of directing a portion of this light to the second optical subsystem 140, which is capable of substantially receiving a portion of the light from the first optical subsystem.

Figure 3A:
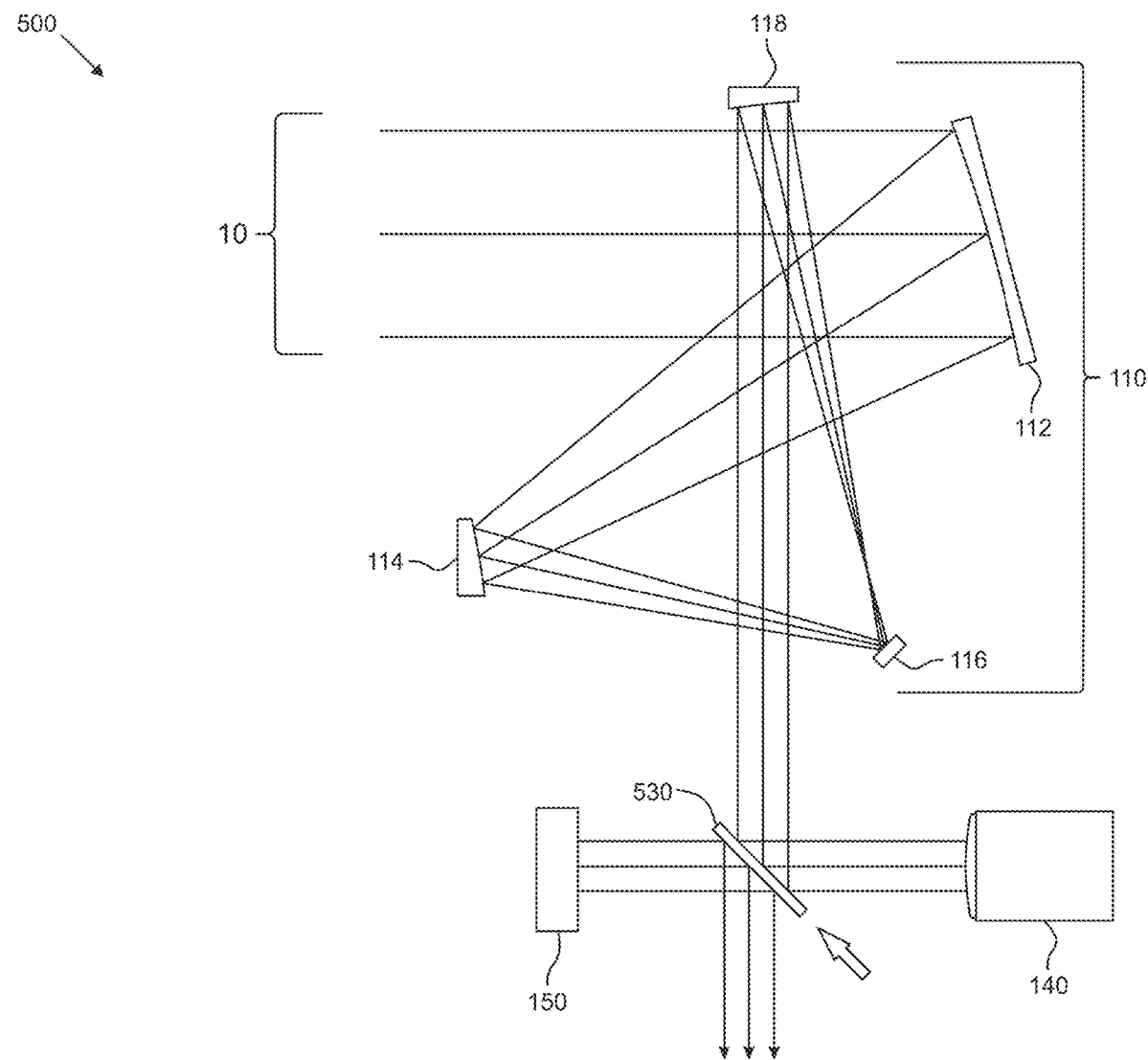
FIG. 3A is a schematic view of a further embodiment of the present invention, shown in a first configuration.

Reference is made to FIG. 3A, which is a schematic view of an embodiment of the present invention, in a first configuration 500. In operation, light 10, emitted or reflected by a first source (not shown), located at the object plane (not shown), is incident upon a first optical subsystem 110, in this embodiment made up of, but not limited to, four reflective elements 112, 114, 116, and 118, such as, but not limited to, mirrors, which is capable of substantially receiving a portion of the light from the first source 10. The first optical subsystem 110 is capable of substantially directing a portion of the light from the first source 10 to a configurable beam diverting device 530, such as, but not limited to, a moveable fold mirror, which is capable of being substantially moved into or out of the optical path, in this embodiment, by means of, but not limited to, translation, rotation, tilting, etc., driven by electrical, mechanical, or other means such as, but not limited to, solenoids, mechanical or motorized stages, including electrical motors such as, but not limited to, stepper motors or DC motors and linkages, etc. In general, the configurable beam diverting device 530 can be configurable by any means, mechanically, electrically, optically, or otherwise, that changes its ability to transmit, reflect, or otherwise redirect light. In this first configuration 500, the configurable beam diverting device 530 is moved substantially into the optical path and configured to substantially reflect or redirect a portion of the light from the first source 10 to a second optical subsystem 140, which can be made of any number of optical elements, either reflective, refractive, catadioptric, diffractive, or otherwise, and in general is any optical subsystem, which is capable of substantially receiving a portion of the light from the first optical subsystem. Light emitted or reflected by a second source 150, which is substantially located along an optical path substantially separate from the first source, is also incident upon the configurable beam diverting device 530. In this first configuration 500, the configurable beam diverting device 530 is configured to substantially reflect or redirect a portion of the light from the second source 150 away from the second optical subsystem 140.

Figure 3B:
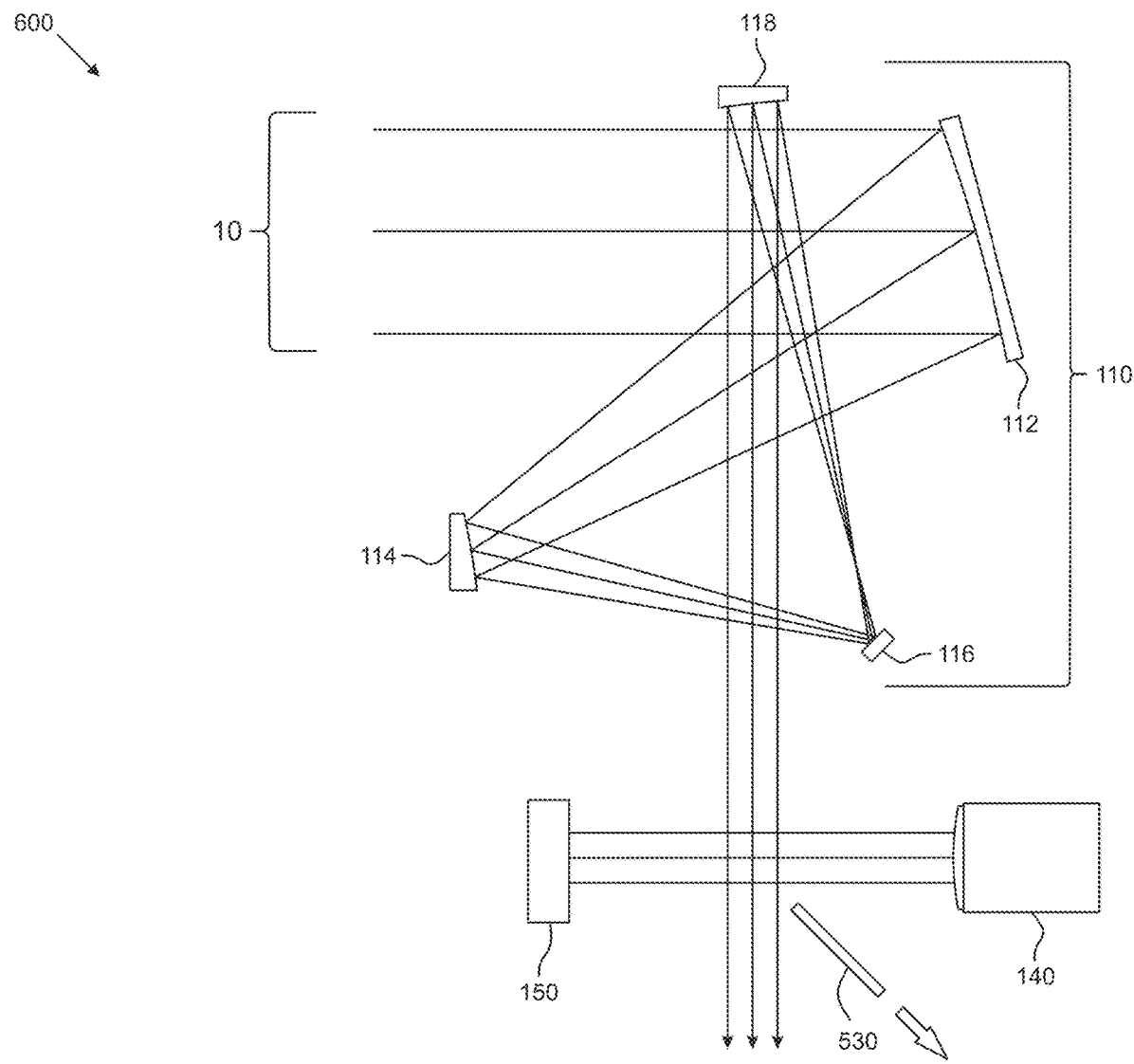
FIG. 3B is a schematic view of the embodiment of the present invention described in FIG. 3A, shown in a second configuration.

Reference is made to FIG. 3B, which is a schematic view of the embodiment of the present invention illustrated in FIG. 3A, in a second configuration 600. In operation, light 10, emitted or reflected by the first source (not shown), located at the object plane (not shown), is incident upon the first optical subsystem 110, in this embodiment made up of, but not limited to, four reflective elements 112, 114, 116, and 118, such as, but not limited to, mirrors, which is capable of substantially receiving a portion of the light from the first source 10 and substantially directing a portion of the light from the first source 10 to the configurable beam diverting device 130. In this second configuration 600, the configurable beam diverting device 530 is moved substantially out of the optical path such that the second optical subsystem 140 is substantially not capable of receiving a portion of the light from the first source 10. The second source 150, which is substantially located along an optical path substantially separate from the first source, is optically disposed and configured such that light from the second source 150 is also incident upon the configurable beam diverting device 530. In this second configuration 600, with the configurable beam diverting device 530 is moved substantially out of the optical path, the second optical subsystem 140 is substantially capable of receiving a portion of the light from the second source 150.

Figure 4A:
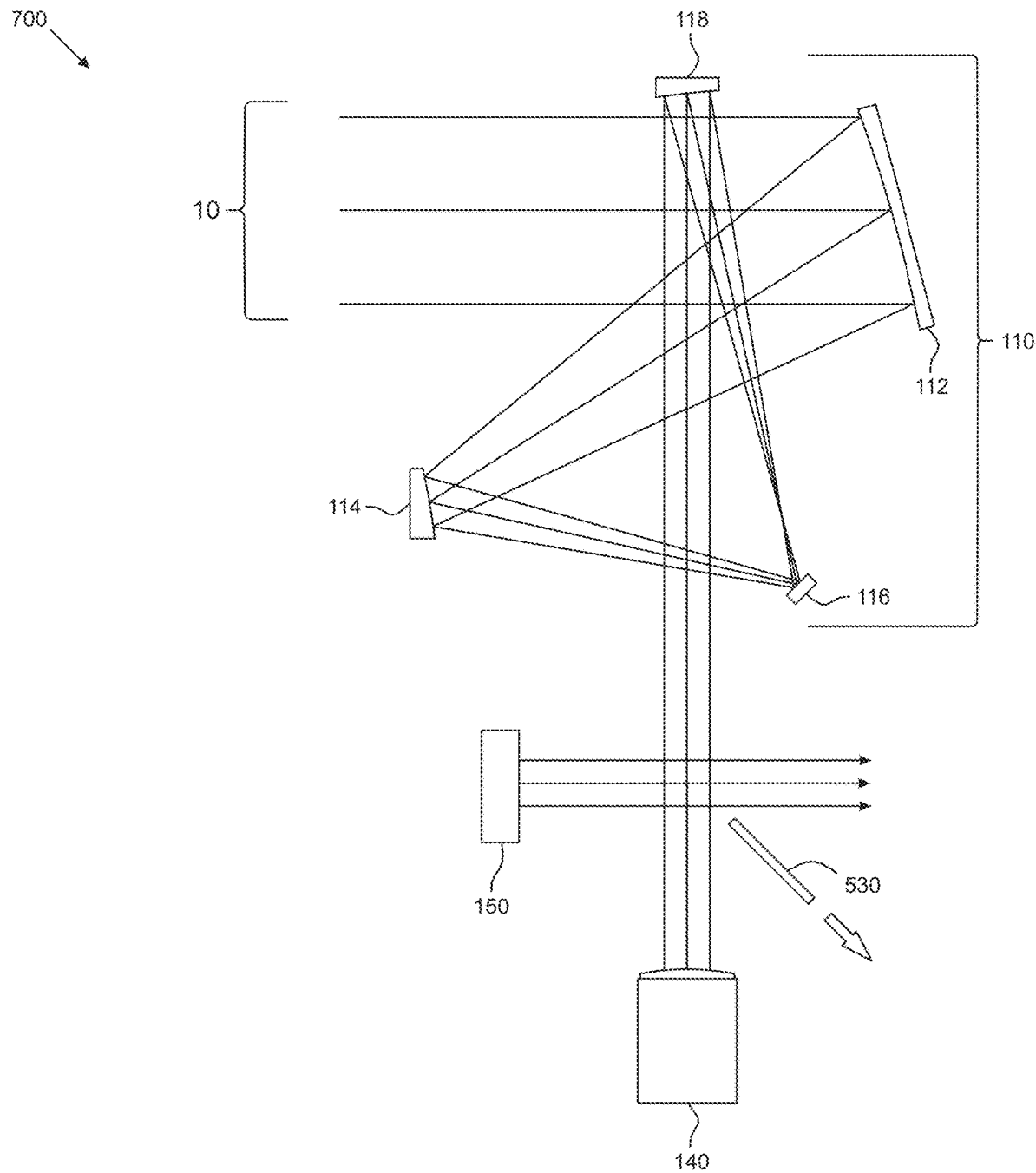
FIG. 4A is a schematic view of a still further embodiment of the present invention, shown in a first configuration.

Reference is made to FIG. 4A, which is a schematic view of an embodiment of the present invention, in a first configuration 700. In operation, light 10, emitted or reflected by a first source (not shown), located at the object plane (not shown), is incident upon a first optical subsystem 110, in this embodiment made up of, but not limited to, four reflective elements 112, 114, 116, and 118, such as, but not limited to, mirrors, which is capable of substantially receiving a portion of the light from the first source 10. The first optical subsystem 110 is capable of substantially directing a portion of the light from the first source 10 to a second optical subsystem 140, which can be made of any number of optical elements, either reflective, refractive, catadioptric, diffractive, or otherwise, and in general is any optical subsystem, which is capable of substantially receiving a portion of the light from the first optical subsystem. A second source 150, which is substantially located along an optical path substantially separate from the first source, is optically disposed and configured such that the second optical subsystem 140 is substantially not capable of receiving a portion of the light from the second source 150.

In this first configuration 700, a configurable beam diverting device 530, such as, but not limited to, a moveable fold mirror, which is capable of being substantially moved into or out of the optical path, in this embodiment, by means of, but not limited to, translation, rotation, tilting, etc., driven by electrical, mechanical, or other means such as, but not limited to, solenoids, mechanical or motorized stages, etc., is moved substantially out of the optical path of the portion of the light directed by the first optical subsystem 110 to the second optical subsystem 140. In general, the configurable beam diverting device 530 can be configurable by any means, mechanically, electrically, optically, or otherwise, that changes its ability to transmit, reflect, or otherwise redirect light.

Figure 4B:
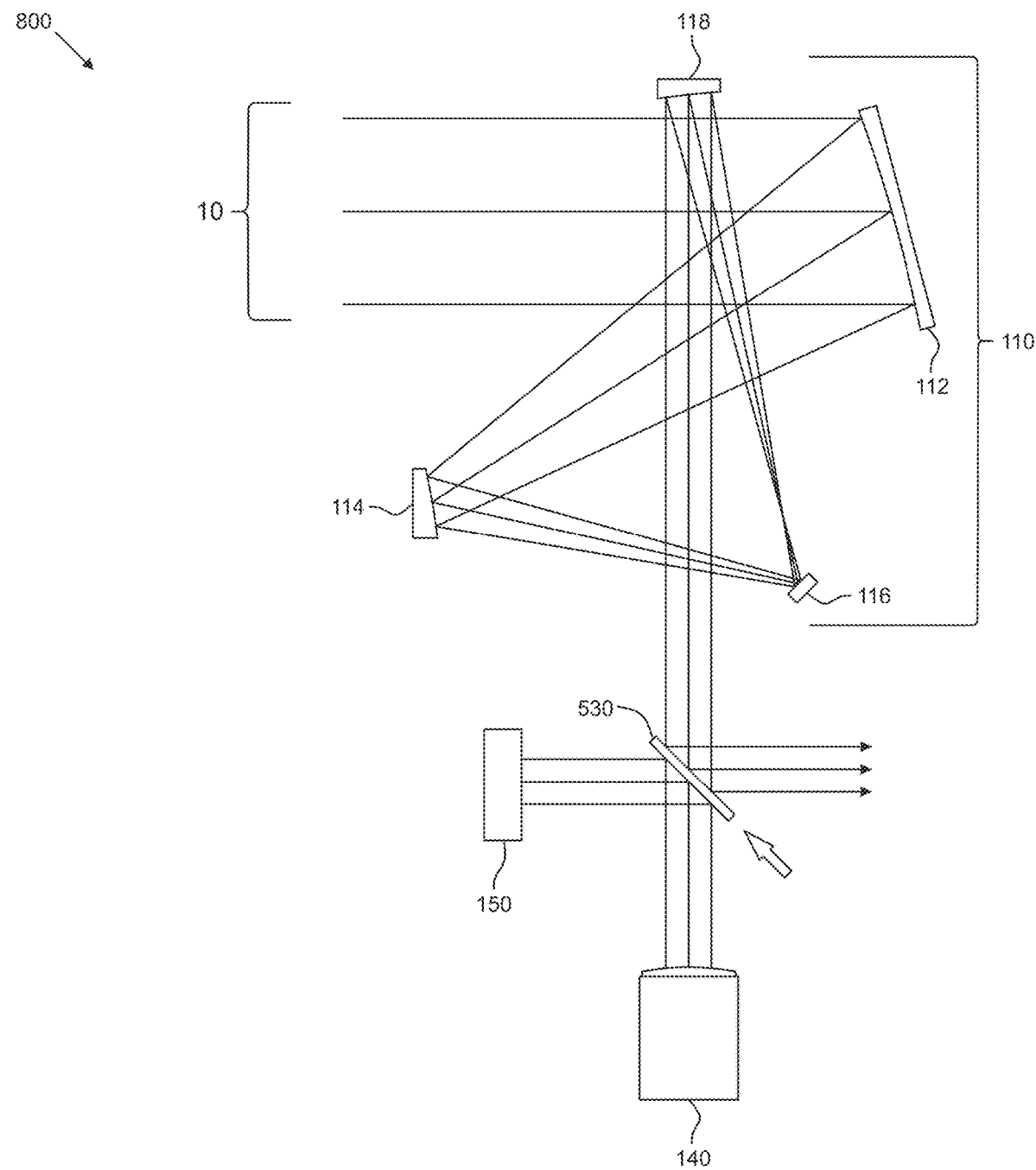
FIG. 4B is a schematic view of the embodiment of the present invention described in FIG. 4A, shown in a second configuration.

Reference is made to FIG. 4B, which is a schematic view of the embodiment of the present invention illustrated in FIG. 4A, in a second configuration 800. In operation, light 10, emitted or reflected by the first source (not shown), located at the object plane (not shown), is incident upon the first optical subsystem 110, in this embodiment made up of, but not limited to, four reflective elements 112, 114, 116, and 118, such as, but not limited to, mirrors, which is capable of substantially receiving a portion of the light from the first source 10 and substantially directing a portion of the light from the first source 10 to the configurable beam diverting device 530. In this second configuration 800, the configurable beam diverting device 530 is moved substantially into the optical path and configured to substantially reflect or redirect a portion of the light from the first source 10 substantially away from the second optical subsystem 140. The second source 150, which is substantially located along an optical path substantially separate from the first source, is optically disposed and configured such that light from the second source 150 is also incident upon the configurable beam diverting device 530. In this second configuration 800, the configurable beam diverting device 530 is configured to substantially reflect or redirect a portion of the light from the second source 150 to the second optical subsystem 140, which is substantially capable of receiving a portion of the light from the second source 150.

Figure 5A:
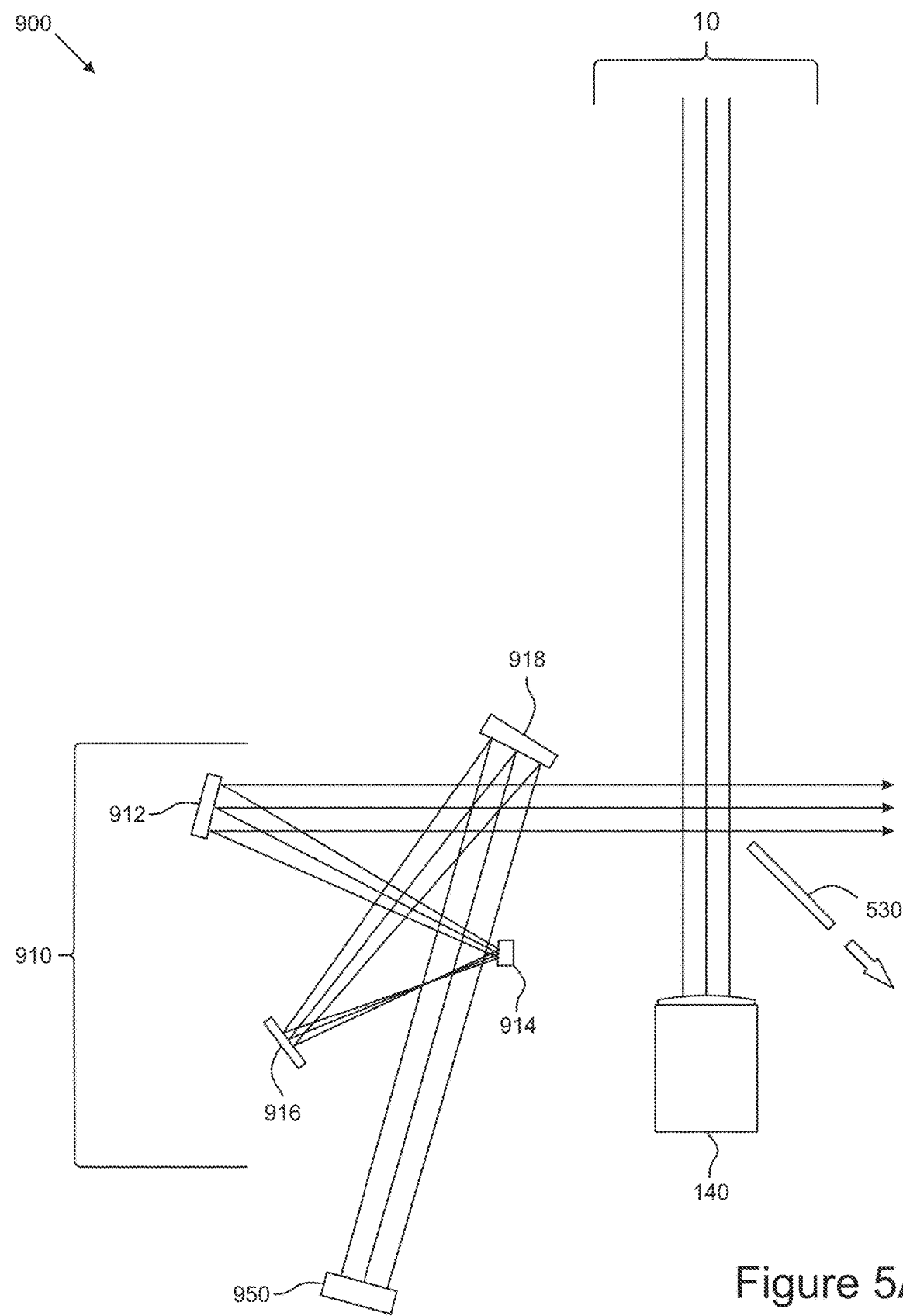
FIG. 5A is a schematic view of a yet still further embodiment of the present invention, shown in a first configuration.

Reference is made to FIG. 5A, which is a schematic view of an embodiment of the present invention, in a first configuration 900. In operation, light 10, emitted or reflected by a first source (not shown), located at the object plane (not shown), is incident upon a first optical subsystem 140, which can be made of any number of optical elements, either reflective, refractive, catadioptric, diffractive, or otherwise, and in general is any optical subsystem, which is capable of substantially receiving a portion of the light from the first optical subsystem.

Light emitted or reflected by a second source 950, which is substantially located along an optical path substantially separate from the first source, is incident upon a second optical subsystem 910, in this embodiment made up of, but not limited to, four reflective elements 912, 914, 916, and 918, such as, but not limited to, mirrors, which is capable of substantially receiving a portion of the light from the second source 950. The second optical subsystem 910 is capable of substantially directing a portion of the light from the second source 950 such that the first optical subsystem 140 is substantially not capable of receiving a portion of the light from the second source 950.

In this first configuration 900, a configurable beam diverting device 530, such as, but not limited to, a moveable fold mirror, which is capable of being substantially moved into or out of the optical path, in this embodiment, by means of, but not limited to, translation, rotation, tilting, etc., driven by electrical, mechanical, or other means such as, but not limited to, solenoids, mechanical or motorized stages, etc., is moved substantially out of the optical path of the portion of the light 10 to the first optical subsystem 140. In general, the configurable beam diverting device 530 can be configurable by any means, mechanically, electrically, optically, or otherwise, that changes its ability to transmit, reflect, or otherwise redirect light.

Figure 5B:
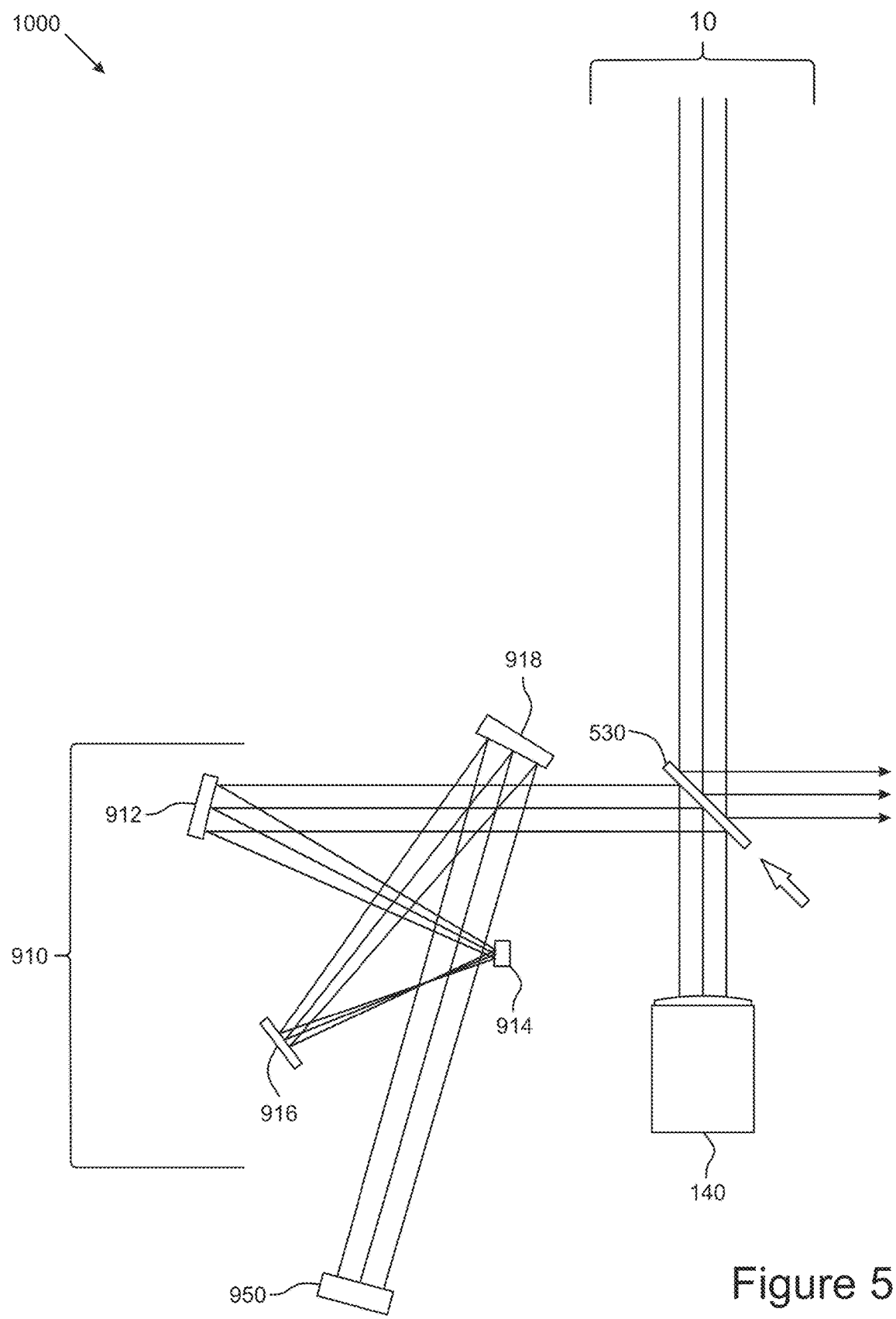
FIG. 5B is a schematic view of the embodiment of the present invention described in FIG. 5A, shown in a second configuration.

Reference is made to FIG. 5B, which is a schematic view of the embodiment of the present invention illustrated in FIG. 5A, in a second configuration 1000. In operation, light 10, emitted or reflected by the first source (not shown), located at the object plane (not shown), is incident upon the configurable beam diverting device 530. In this second configuration 1000, the configurable beam diverting device 530 is moved substantially into the optical path and configured to substantially reflect or redirect a portion of the light from the first source 10 substantially away from the first optical subsystem 140. The second source 950, which is substantially located along an optical path substantially separate from the first source, is optically disposed and configured such that light from the second source 950 is incident upon the second optical subsystem 910, in this embodiment made up of, but not limited to, four reflective elements 912, 914, 916, and 918, such as, but not limited to, mirrors, which is capable of substantially receiving a portion of the light from the second source 950 and substantially directing a portion of the light from the second source 950 to the configurable beam diverting device 530. In this second configuration 1000, the configurable beam diverting device 530 is configured to substantially reflect or redirect a portion of the light from the second source 950 to the first optical subsystem 140, which is substantially capable of receiving a portion of the light from the second source 950.

Figure 6A:
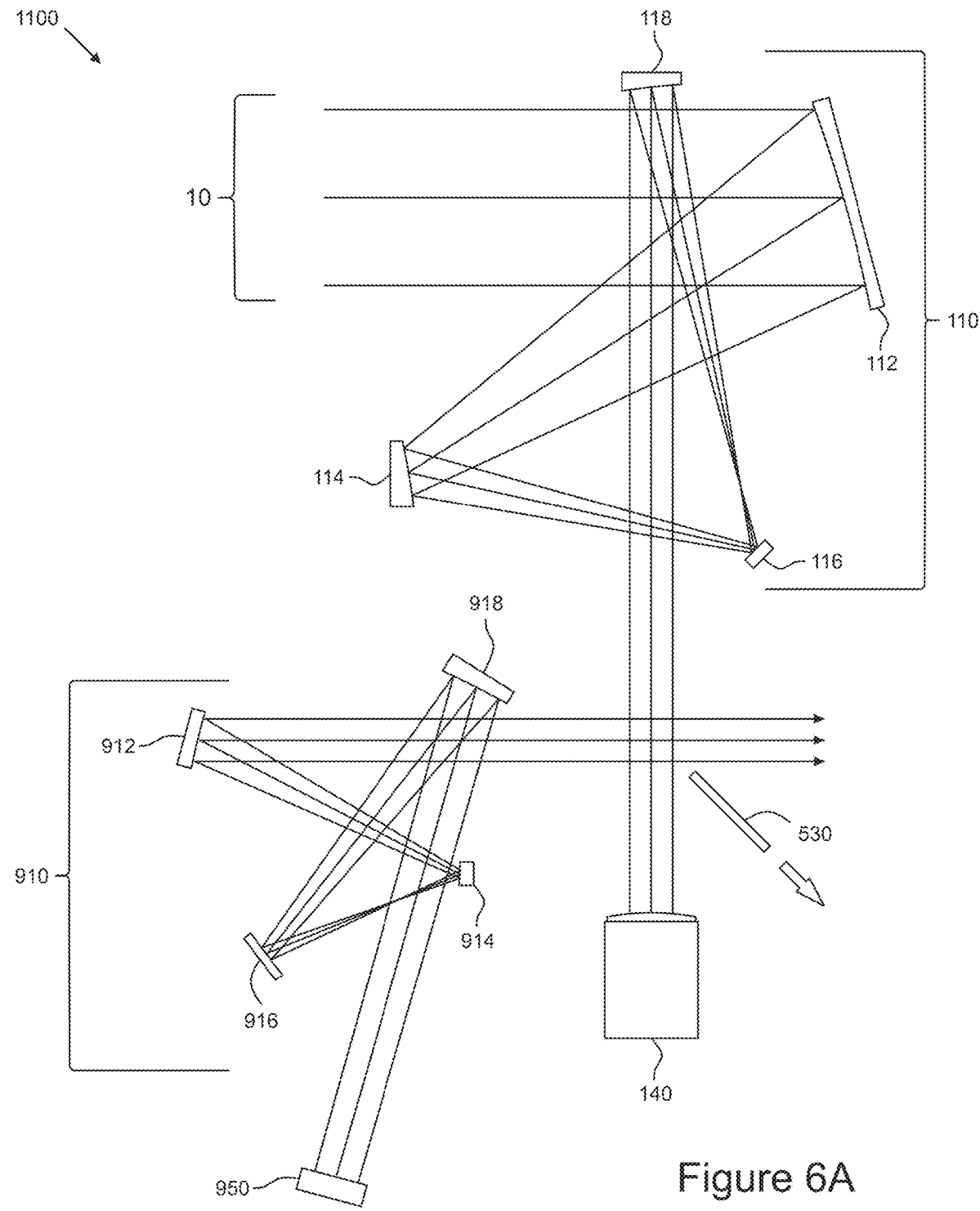
FIG. 6A is a schematic view of a yet still further embodiment of the present invention, shown in a first configuration.

Reference is made to FIG. 6A, which is a schematic view of an embodiment of the present invention, in a first configuration 1100. In operation, light 10, emitted or reflected by a first source (not shown), located at the object plane (not shown), is incident upon a first optical subsystem 110, in this embodiment made up of, but not limited to, four reflective elements 112, 114, 116, and 118, such as, but not limited to, mirrors, which is capable of substantially receiving a portion of the light from the first source 10. The first optical subsystem 110 is capable of substantially directing a portion of the light from the first source 10 to a second optical subsystem 140, which can be made of any number of optical elements, either reflective, refractive, catadioptric, diffractive, or otherwise, and in general is any optical subsystem, which is capable of substantially receiving a portion of the light from the first optical subsystem.

Light emitted or reflected by a second source 950, which is substantially located along an optical path substantially separate from the first source, is incident upon a third optical subsystem 910, in this embodiment made up of, but not limited to, four reflective elements 912, 914, 916, and 918, such as, but not limited to, mirrors, which is capable of substantially receiving a portion of the light from the second source 950. The third optical subsystem 910 is capable of substantially directing a portion of the light from the second source 950 such that the second optical subsystem 140 is substantially not capable of receiving a portion of the light from the second source 950.

In this first configuration 1100, a configurable beam diverting device 530, such as, but not limited to, a moveable fold mirror, which is capable of being substantially moved into or out of the optical path, in this embodiment, by means of, but not limited to, translation, rotation, tilting, etc., driven by electrical, mechanical, or other means such as, but not limited to, solenoids, mechanical or motorized stages, etc., is moved substantially out of the optical path of the portion of the light directed by the first optical subsystem 110 to the second optical subsystem 140. In general, the configurable beam diverting device 530 can be configurable by any means, mechanically, electrically, optically, or otherwise, that changes its ability to transmit, reflect, or otherwise redirect light.

Figure 6B:
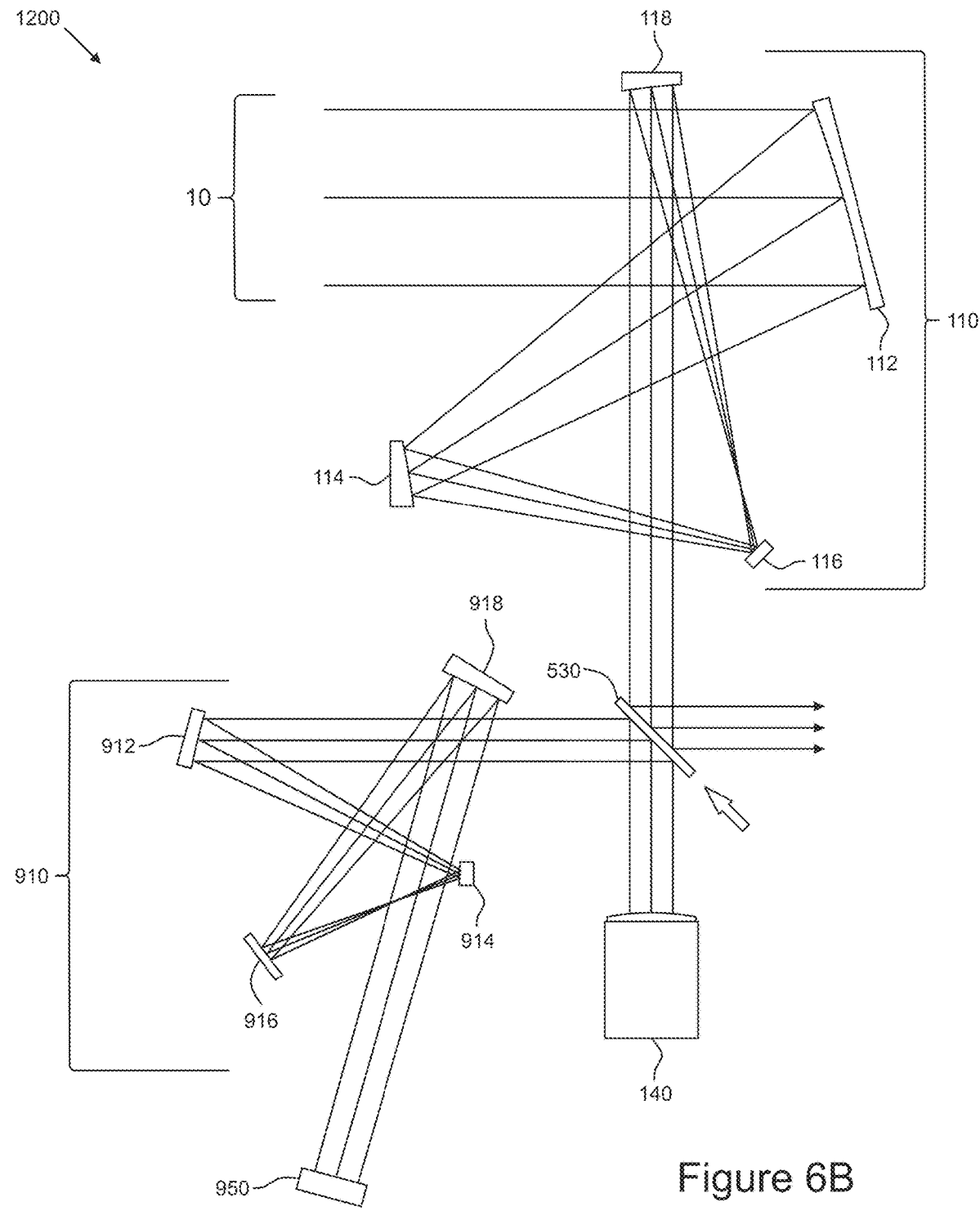
FIG. 6B is a schematic view of the embodiment of the present invention described in FIG. 6A, shown in a second configuration.

Reference is made to FIG. 6B, which is a schematic view of the embodiment of the present invention illustrated in FIG. 6A, in a second configuration 1200. In operation, light 10, emitted or reflected by the first source (not shown), located at the object plane (not shown), is incident upon the first optical subsystem 110, in this embodiment made up of, but not limited to, four reflective elements 112, 114, 116, and 118, such as, but not limited to, mirrors, which is capable of substantially receiving a portion of the light from the first source 10 and substantially directing a portion of the light from the first source 10 to the configurable beam diverting device 530. In this second configuration 1200, the configurable beam diverting device 530 is moved substantially into the optical path and configured to substantially reflect or redirect a portion of the light from the first source 10 substantially away from the second optical subsystem 140. In some embodiments of the present invention, the optical subsystem 140 further comprises a detecting element 142 such as but not limited to a CCD, focal plane array, microbolometer, or in general any means of detecting light, hereinafter referred to as detector 142. Processor or computer 146 is connected to or otherwise configured to receive output from detector 142 and is capable of processing input from the detector 142. These further components of subsystem 140 including detector 142 and processor 146, can be applied to subsystem 140 as is referenced in other figures.

The second source 950, which is substantially located along an optical path substantially separate from the first source, is optically disposed and configured such that light from the second source 950 is incident upon the third optical subsystem 910, in this embodiment made up of, but not limited to, four reflective elements 912, 914, 916, and 918, such as, but not limited to, mirrors, which is capable of substantially receiving a portion of the light from the second source 950 and substantially directing a portion of the light from the second source 950 to the configurable beam diverting device 530. In this second configuration 1200, the configurable beam diverting device 530 is configured to substantially reflect or redirect a portion of the light from the second source 950 to the second optical subsystem 140, which is substantially capable of receiving a portion of the light from the second source 950.

Figure 7A:
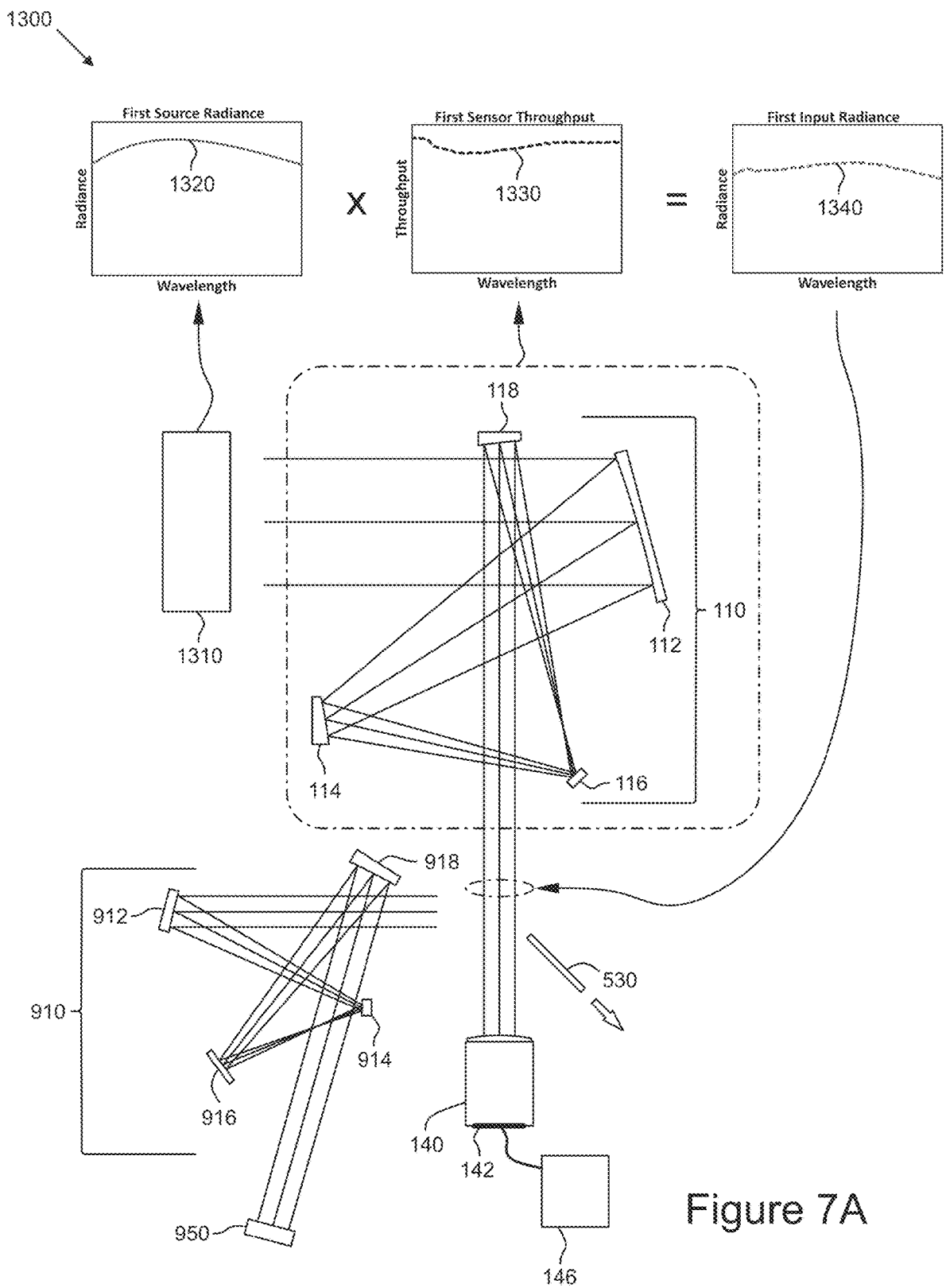
FIG. 7A illustrates a first portion of a calibration method of the present invention for the embodiment of the present invention described in FIGS. 6A and 6B.

Reference is made to FIG. 7A, which is a schematic view of an embodiment of the present invention, in a first configuration 1300. In operation, light, emitted or reflected by a first source 1310, and having a first source radiance 1320, is incident upon a first optical subsystem 110, in this embodiment made up of, but not limited to, four reflective elements 112, 114, 116, and 118, such as, but not limited to, mirrors, which is capable of substantially receiving a portion of the light from the first source 10. The first optical subsystem 110, having a first sensor throughput 1330, is capable of substantially directing a portion of the light from the first source 10 to a second optical subsystem 140, which can be made of any number of optical elements, either reflective, refractive, catadioptric, diffractive, or otherwise, and in general is any optical subsystem, which is capable of substantially receiving a portion of the light, having a first input radiance 1340, from the first optical subsystem.

Light emitted or reflected by a second source 950, which is substantially located along an optical path substantially separate from the first source, is incident upon a third optical subsystem 910, in this embodiment made up of, but not limited to, four reflective elements 912, 914, 916, and 918, such as, but not limited to, mirrors, which is capable of substantially receiving a portion of the light from the second source 950. The second optical system 140 has a detecting element (such as, for example, focal plane array (FPA), charge-coupled device (CCD), CMOS pixel device or similar) The third optical subsystem 910 is capable of substantially directing a portion of the light from the second source 950 such that the second optical subsystem 140 is substantially not capable of receiving a portion of the light from the second source 950.

In this first configuration 1300, a configurable beam diverting device 530, such as, but not limited to, a moveable fold mirror, which is capable of being substantially moved into or out of the optical path, in this embodiment, by means of, but not limited to, translation, rotation, tilting, etc., driven by electrical, mechanical, or other means such as, but not limited to, solenoids, mechanical or motorized stages, etc., is moved substantially out of the optical path of the portion of the light directed by the first optical subsystem 110 to the second optical subsystem 140. In general, the configurable beam diverting device 530 can be configurable by any means, mechanically, electrically, optically, or otherwise, that changes its ability to transmit, reflect, or otherwise redirect light.

Figure 7B:
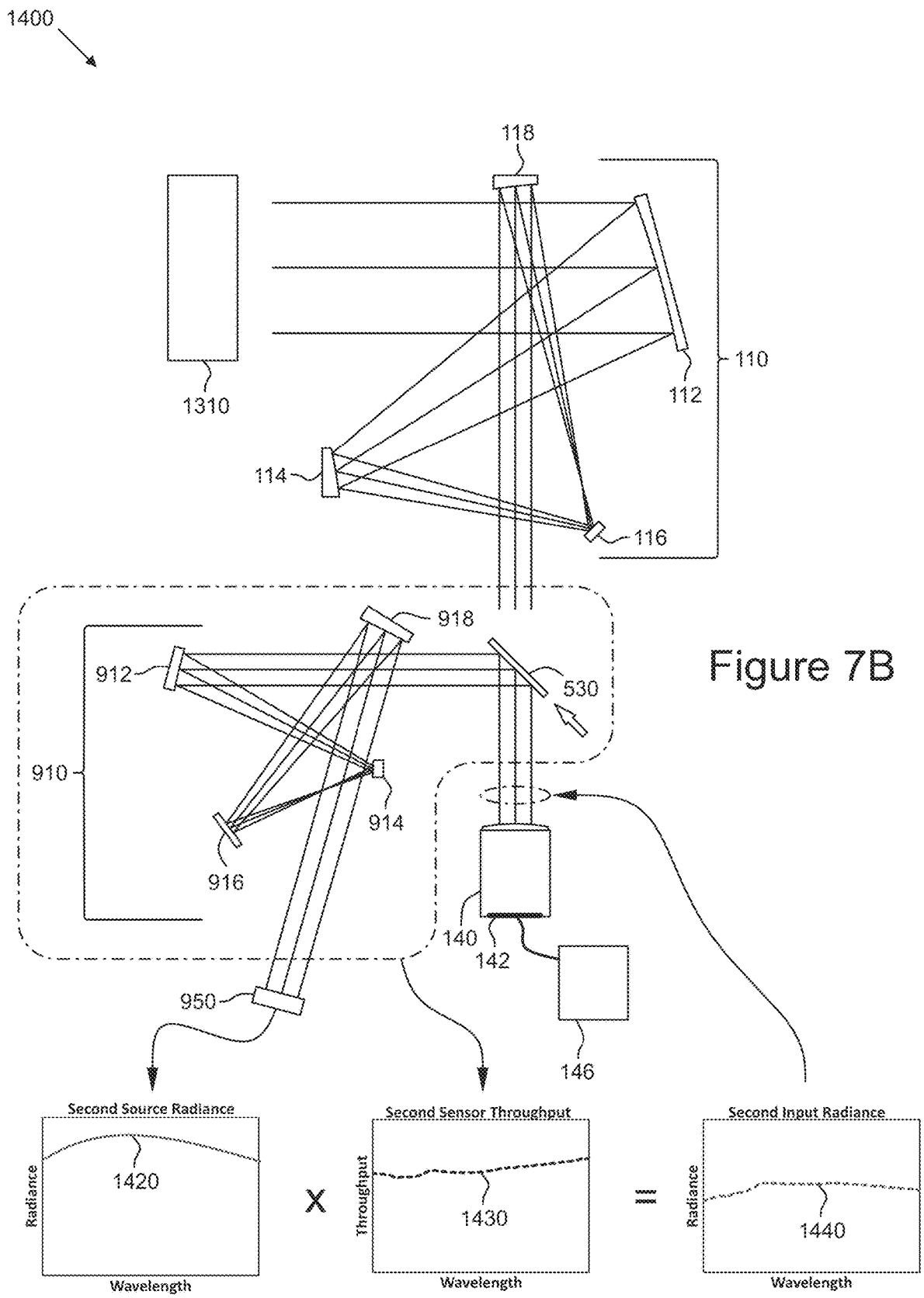
FIG. 7B illustrates a second portion of a calibration method of the present invention for the embodiment of the present invention described in FIGS. 6A and 6B.

Reference is made to FIG. 7B, which is a schematic view of the embodiment of the present invention illustrated in FIG. 7A, in a second configuration 1400. In operation, light, emitted or reflected by a first source 1310, is incident upon the first optical subsystem 110, in this embodiment made up of, but not limited to, four reflective elements 112, 114, 116, and 118, such as, but not limited to, mirrors, which is capable of substantially receiving a portion of the light from the first source 10 and substantially directing a portion of the light from the first source 10 to the configurable beam diverting device 530. In this second configuration 1400, the configurable beam diverting device 530 is moved substantially into the optical path and configured to substantially reflect or redirect a portion of the light from the first source 10 substantially away from the second optical subsystem 140.

The second source 950, which is substantially located along an optical path substantially separate from the first source, and having a second source radiance 1420, is optically disposed and configured such that light from the second source 950 is incident upon the third optical subsystem 910, in this embodiment made up of, but not limited to, four reflective elements 912, 914, 916, and 918, such as, but not limited to, mirrors, which is capable of substantially receiving a portion of the light from the second source 950 and substantially directing a portion of the light from the second source 950 to the configurable beam diverting device 530. In this second configuration 1400, the configurable beam diverting device 530, having a combined second sensor throughput 1430 with the third optical subsystem 910, is configured to substantially reflect or redirect a portion of the light from the second source 950 to the second optical subsystem 140, which is substantially capable of receiving a portion of the light, having a second input radiance 1440, from the second source 950.

Figure 8A:
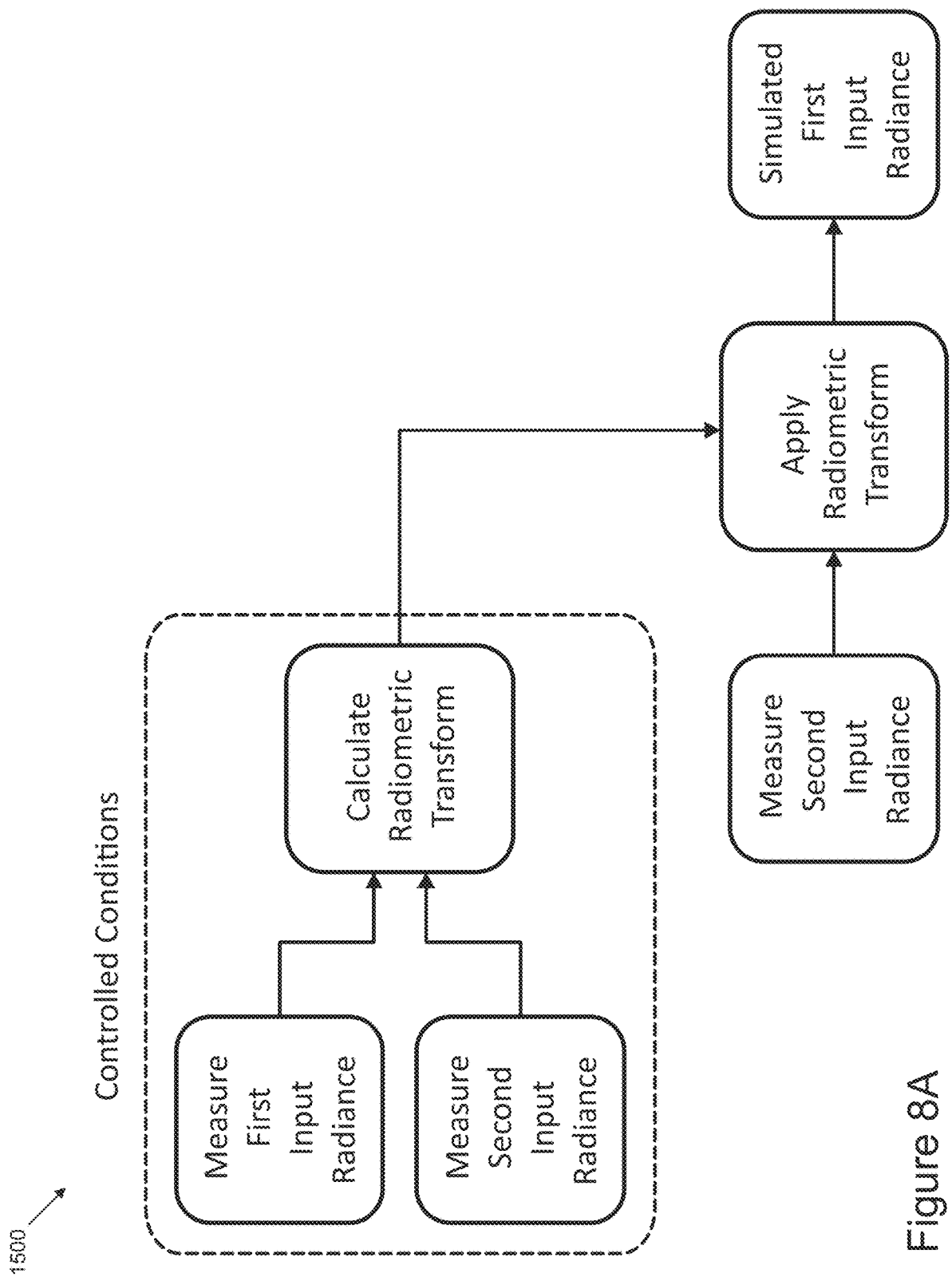
FIG. 8A is a general flow diagram of a calibration method of the present invention.

Reference is made to FIG. 8A, which is a general flow diagram of a calibration method of the present invention 1500. In operation, a measurement, in the form of radiance, voltage, imagery, etc., of a first input radiance, and a measurement, in the form of radiance, voltage, imagery, etc., of a second input radiance, typically taken under, but not restricted to, controlled conditions, are combined mathematically to substantially calculate a radiometric transform, such that the radiometric correction coefficients can be substantially applied to subsequent measurements of the second input radiance to substantially simulate measurements of the first input radiance. This transform may be performed or calculated on individual rows, columns, pixels, or the output of the radiometric data in its entirety. In this manner for example, once the radiometric transform has been calculated, the radiometric calibration of measurements of any external source or object can be substantially performed without the need for an external radiometric calibration source, and can instead be substantially performed using a second, typically, but not limited to, internal radiometric calibration source. This can provide substantial benefit to a radiometric sensor by providing either a more controlled or more accurate calibration source, or a more compact sensor packaging, or a reduced combined sensor weight, or a reduced power consumption, or greater modularity, or any number of other benefits including various combinations of these benefits.

Figure 8B:
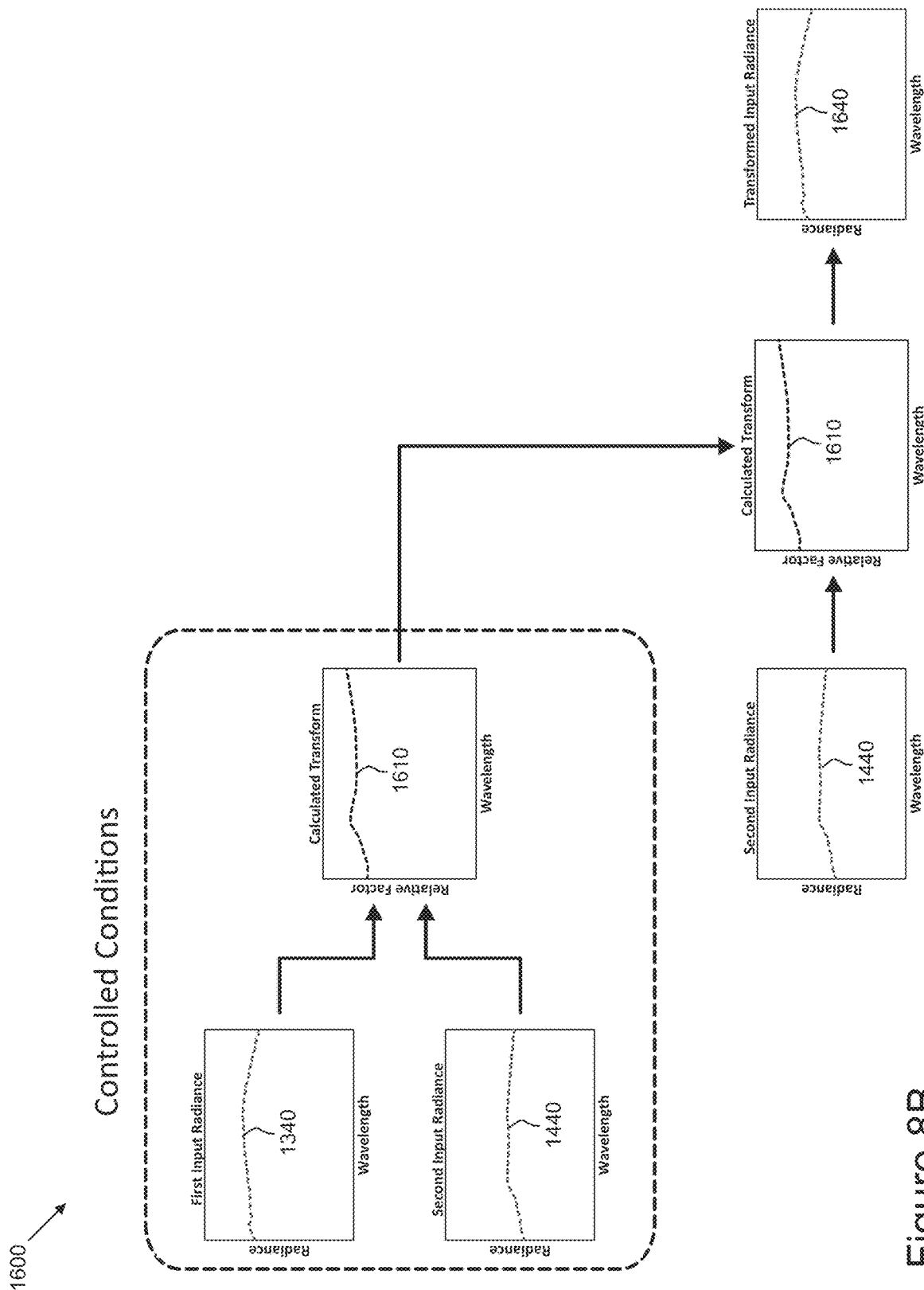
FIG. 8B is a flow diagram of a calibration method of the present invention for the embodiment of the present invention described in FIGS. 6A, 6B, 7A, and 7B.

Reference is made to FIG. 8B, which is a flow diagram of a calibration method of the present invention 1600 for the embodiment of the present invention illustrated in FIGS. 6A, 6B, 7A, and 7B. In operation, a measurement of the first input radiance 1340 in the embodiment of the present invention 1300 illustrated FIG. 7A and a measurement of the second input radiance 1440 in the embodiment of the present invention 1400 illustrated in FIG. 7B, typically taken under, but not restricted to, controlled conditions, are combined mathematically to substantially calculate a radiometric transform 1610, such that the radiometric transform 1610 can be substantially applied to subsequent measurements of the second input radiance 1440 to substantially generate a transformed input radiance 1640 that substantially simulates the measurement of the first input radiance 1340. Once the radiometric transform 1610 has been calculated, the radiometric calibration of measurements of the external source or object 10 in the embodiment of the present invention 1100 illustrated in FIG. 6A can be substantially performed without the need for an external radiometric calibration source, and can instead be substantially performed using the second radiometric source 950 in the embodiment of the present invention 1200, in the embodiment 1200 consisting of, but not limited to, an internal radiometric source. This can provide substantial benefit to a radiometric sensor by providing either a more controlled or more accurate calibration source, or a more compact sensor packaging, or a reduced combined sensor weight, or a reduced power consumption, or greater modularity, or any number of other benefits including various combinations of these benefits.

Reference is made to FIG. 9, which is an equation 1700 for a portion of a calibration method of the present invention for the embodiment of the present invention illustrated in FIGS. 6A, 6B, 7A, and 7B, where the output of the second optical subassembly 140 in the embodiments of the present invention 1100, 1200, 1300, and 1400, is a digital image from a detector. In this equation, the difference between the output of the second optical subassembly 140 due to the portion of the light from the first source 10 in the embodiment of the present invention 1300, typically in the form of, but not limited to, volts, counts, analog-to-digital units (ADUs), etc., and the output of the second optical subassembly 140 when exposed to substantially no light, typically referred to as the starvation level of the sensor, is treated as proportional to the radiance of the first source 10 in the embodiment of the present invention 1300, with some offset due to other radiance sources at some ambient temperature. In this equation, the relationship between the radiance of the first source 10 in the embodiment of the present invention 1300 has the form of a linear polynomial, and a similar equation can be used to model the relationship between the radiance of the second source 950 in the embodiment of the present invention 1400. From these relationships, a transform equation can be substantially generated by which the radiance from the second source 950 can be transformed to simulate the radiance from the first source 10, whereby the values of the various coefficients, such as but not limited to the transmission or throughput of various portions of the sensor, the emissivity, radiance, or temperature of background contributors, the integration time or responsivity of the sensor, etc., are specific to the sensor. In some embodiments, such as but not limited to those of visible spectrum sensors, the offset terms may be negligible and potentially ignored, while in others, such as but not limited to those of thermal of infrared sensors, they must be carefully monitored and accounted for in the transform process. This equation 1700 is a relatively simple representation of the relationship between radiance and sensor output, and in many cases by be significantly more complex, including integration of many other contributors, but the primary teachings of the embodiment by which any equation, regardless of how simple or complex, which represents the relationship between radiance and sensor output can be used to generate a transform by which one source radiance can be simulated by means of measurement of another, substantially separate, source radiance.

Figure 10A:
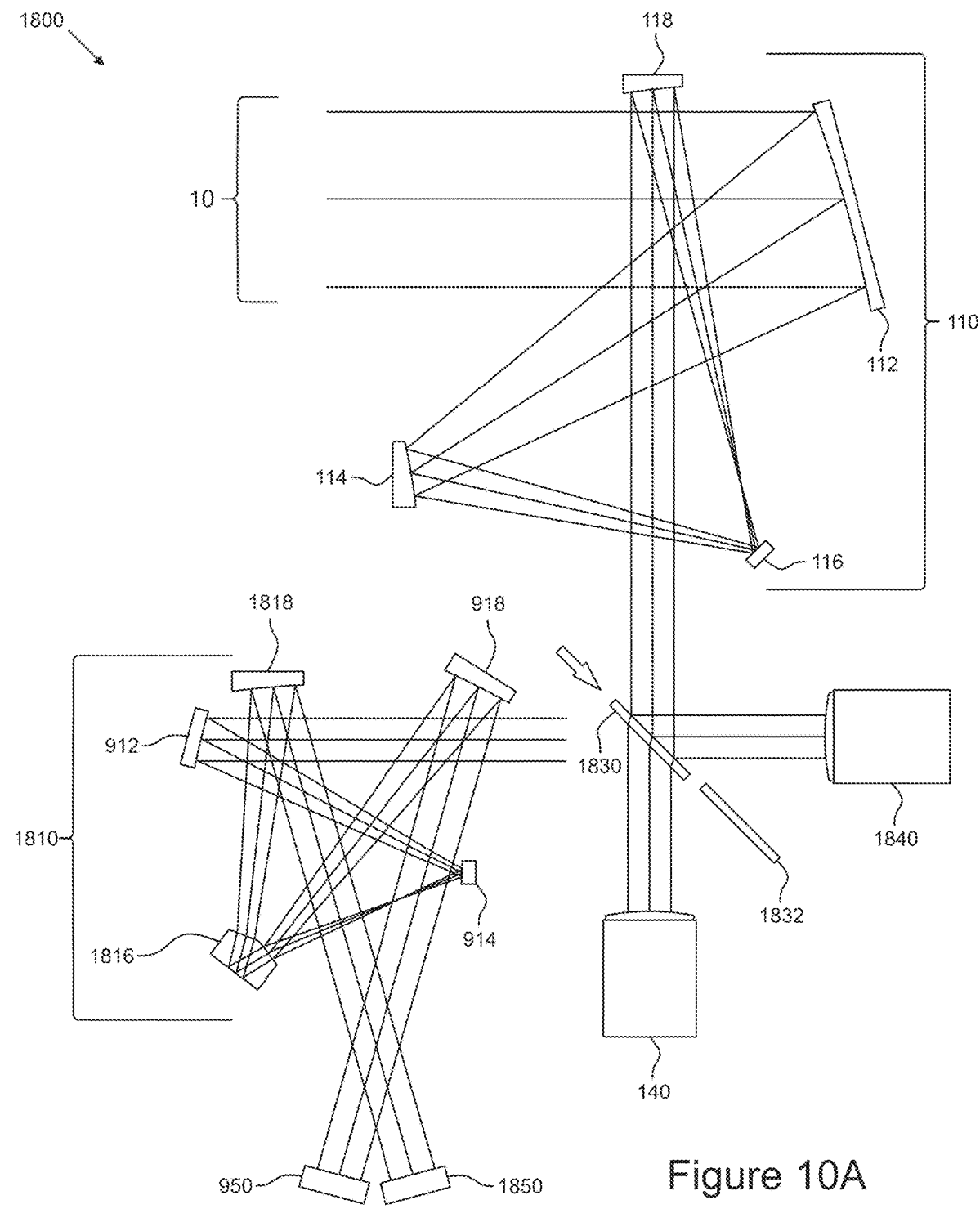
FIG. 10A is a schematic view of a yet still further embodiment of the present invention, shown in a first configuration.

Reference is made to FIG. 10A, which is a schematic view of an embodiment of the present invention, in a first configuration 1800. In operation, light 10, emitted or reflected by a first source (not shown), located at the object plane (not shown), is incident upon a first optical subsystem 110, in this embodiment made up of, but not limited to, four reflective elements 112, 114, 116, and 118, such as, but not limited to, mirrors, which is capable of substantially receiving a portion of the light from the first source 10. The first optical subsystem 110 is capable of substantially directing a portion of the light from the first source 10 to a first configurable beam splitting device 1830, such as, but not limited to, a moveable beam splitter, dichroic, or in general any device substantially capable of separating light into two or more portions, which is capable of being substantially moved into or out of the optical path, in this embodiment, by means of, but not limited to, translation, rotation, tilting, etc., driven by electrical, mechanical, or other means such as, but not limited to, solenoids, mechanical or motorized stages, etc. In general, the first configurable beam splitting device 1830 can be configurable by any means, mechanically, electrically, optically, or otherwise, that changes its ability to transmit, reflect, or otherwise redirect light.

In this first configuration 1800, the first configurable beam splitting device 1830 is moved substantially into the optical path and configured to substantially direct a first portion of the light from the first source 10 to a second optical subsystem 140, which can be made of any number of optical elements, either reflective, refractive, catadioptric, diffractive, or otherwise, and in general is any optical subsystem, which is capable of substantially receiving a portion of the light from the first optical subsystem, and also configured to substantially direct a second portion of the light from the first source 10 in a direction substantially different from the direction of the first portion of the light from the first source 10 to a third optical subsystem 1840, which can be made of any number of optical elements, either reflective, refractive, catadioptric, diffractive, or otherwise, and in general is any optical subsystem, which is capable of substantially receiving a portion of the light from the first optical subsystem.

Light emitted or reflected by a second source 950, which is substantially located along an optical path substantially separate from the first source, is incident upon a fourth optical subsystem 910, in this embodiment made up of, but not limited to, four reflective elements 912, 914, 918, and 1818, such as, but not limited to, mirrors, and a beam splitting device 1816, such as but not limited to a beam splitting prism, which is capable of substantially receiving a portion of the light from the second source 950. See, for example, U.S. Pat. No. 10,288,892 to Mitchell, entitled "Common Aperture Optical Relay System," and U.S. Pat. No. 10,386,239 to Mitchell, entitled "Compact hyperspectral systems," both of which are incorporated herein by reference in their entirety and for all purposes. The fourth optical subsystem 910 is capable of substantially directing a portion of the light from the second source 950 such that the second optical subsystem 140 and the third optical subsystem 1840 are substantially not capable of receiving a portion of the light from the second source 950. Light emitted or reflected by a third source 1850, which is substantially located along an optical path substantially separate from the first source and the second source, is also incident upon the fourth optical subsystem 910, which is capable of substantially receiving a portion of the light from the third source 1850. The fourth optical subsystem 910 is capable of substantially directing a portion of the light from the third source 1850 such that the second optical subsystem 140 and the third optical subsystem 1840 are substantially not capable of receiving a portion of the light from the third source 1850.

A second configurable beam splitting device 1832, such as, but not limited to, a moveable beam splitter, dichroic, or in general any device substantially capable of separating light into two or more portions, which is capable of being substantially moved into or out of the optical path, in this embodiment, by means of, but not limited to, translation, rotation, tilting, etc., driven by electrical, mechanical, or other means such as, but not limited to, solenoids, mechanical or motorized stages, etc., is moved substantially out of the optical path of the first portion of the light directed by the first optical subsystem 110 to the second optical subsystem 140 and substantially out of the optical path of the second portion of the light directed by the first optical subsystem 110 to the third optical subsystem 1840. In general, the second configurable beam splitting device 1832 can be configurable by any means, mechanically, electrically, optically, or otherwise, that changes its ability to transmit, reflect, or otherwise redirect light. See, for example, U.S. Pat. No. 10,139,638 to Mitchell, entitled "Common Aperture Optical System and Selective Imaging Method," which is incorporated here by reference in its entirety for all purposes.

Figure 10B:
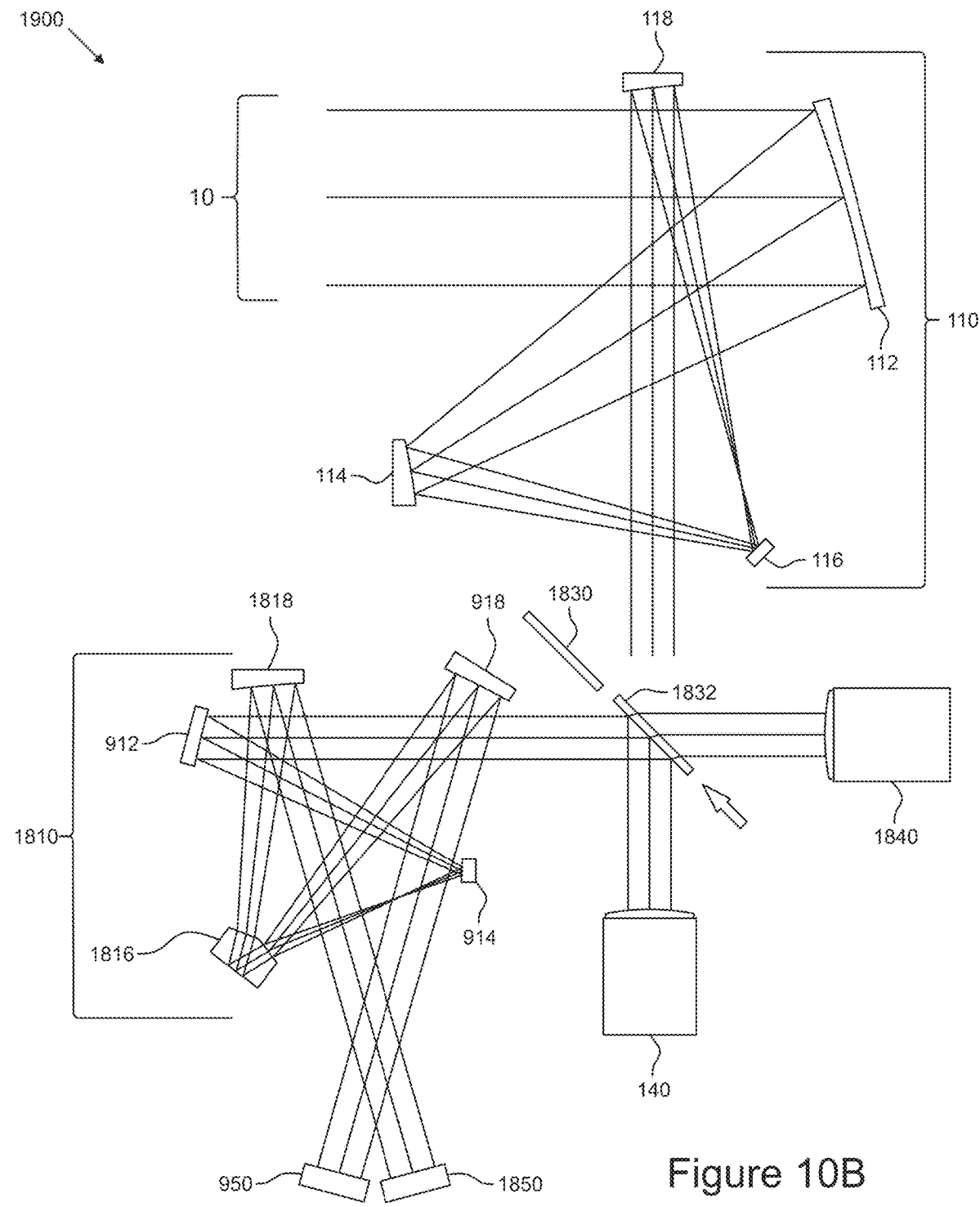
FIG. 10B is a schematic view of the embodiment of the present invention described in FIG. 10A, shown in a second configuration.

Reference is made to FIG. 10B, which is a schematic view of the embodiment of the present invention illustrated in FIG. 10A, in a second configuration 1900. In operation, light 10, emitted or reflected by the first source (not shown), located at the object plane (not shown), is incident upon the first optical subsystem 110, in this embodiment made up of, but not limited to, four reflective elements 112, 114, 116, and 118, such as, but not limited to, mirrors, which is capable of substantially receiving a portion of the light from the first source 10 and substantially directing a portion of the light from the first source 10 to the second configurable beam splitting device 1832.

In this second configuration 1900, the first configurable beam splitting device 1830 is moved substantially out of the optical path of the first portion of the light directed by the first optical subsystem 110 to the second optical subsystem 140 and substantially out of the optical path of the second portion of the light directed by the first optical subsystem 110 to the third optical subsystem 1840. The second configurable beam splitting device 1832 is moved substantially into the optical path and configured to substantially direct a first portion of the light from the first source 10 to a second optical subsystem 140, which can be made of any number of optical elements, either reflective, refractive, catadioptric, diffractive, or otherwise, and in general is any optical subsystem, which is capable of substantially receiving a portion of the light from the first optical subsystem, and also configured to substantially direct a second portion of the light from the first source 10 in a direction substantially different from the direction of the first portion of the light from the first source 10 to a third optical subsystem 1840, which can be made of any number of optical elements, either reflective, refractive, catadioptric, diffractive, or otherwise, and in general is any optical subsystem, which is capable of substantially receiving a portion of the light from the first optical subsystem.

Light emitted or reflected by a second source 950, which is substantially located along an optical path substantially separate from the first source, is incident upon a fourth optical subsystem 910, in this embodiment made up of, but not limited to, four reflective elements 912, 914, 918, and 1818, such as, but not limited to, mirrors, and a beam splitting device 1816, such as but not limited to a beam splitting prism, which is capable of substantially receiving a portion of the light from the second source 950. The fourth optical subsystem 910 is capable of substantially directing a portion of the light from the second source 950 to a second configurable beam splitting device 1832 which is substantially capable of directing a portion of the light from the second source 950 to the second optical subsystem 140. Light emitted or reflected by a third source 1850, which is substantially located along an optical path substantially separate from the first source and the second source, is also incident upon the fourth optical subsystem 910, which is capable of substantially receiving a portion of the light from the third source 1850. The fourth optical subsystem 910 is capable of substantially directing a portion of the light from the third source 1850 to the second configurable beam splitting device 1832 which is also substantially capable of directing a portion of the light from the third source 1850 to the third optical subsystem 1840. See, for example, U.S. Pat.

No. 10,386,239 to Mitchell, entitled "Compact Hyperspectral Systems," or U.S. Pat. No. 10,024,720, to Mitchell, which are incorporated here by reference in their entirety and for all purposes.

Although the measurement of light in these teachings is generally referred to here as measurements of radiance, the output of the various optical subassemblies, typically from, but not limited to, focal plane array (FPA), charge-coupled device (CCD), photographic material, etc., that are part of or used in conjunction with the optical subassemblies, typically in the form of, but not limited to, volts, counts, analog-to-digital units (ADUs), density, etc., can be measurements of any number of other optical properties, parameters, or quantities, such as, but not limited to, emissivity, reflectance, absorption, phosphorescence, luminance, etc., which can be corrected or calibrated by means of the embodiments of the present invention, whereby the calculated transform is appropriately suited for the specific optical property of light being measured.

Figure 11:
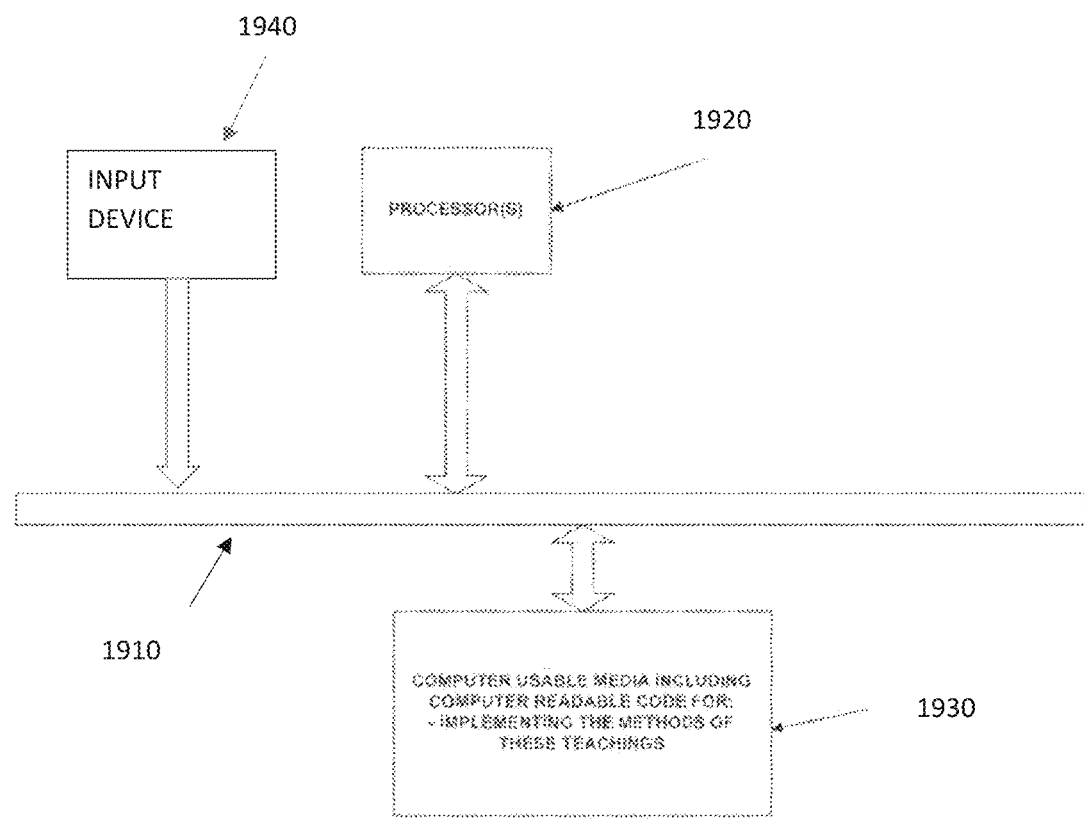
FIG. 11 is a schematic block diagram representation of one component of the embodiment of the system of these teachings shown in FIG. 7A.

As shown in FIG. 11, one or more processors 1920 and one or more computer usable media 1930 that has computer readable code embodied therein, the computer readable code causing the one or more processors to execute at least a portion of the method of these teachings. An input device 1940 (for example, but not limited to, a keyboard, a USB port, a CD reader, an A/D component, output from a focal array or similar) provides input data that can be stored in the computer usable media 1930. A computer interconnection component (such as, a computer bus) provides interconnection between the input device 1940, the computer usable media 1930 and the one or more processors 1920.

Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, any physical medium with patterns of holes, a RAM, a PROM, and EPROM, a FLASH-EPROM, any other memory chip or cartridge, all of which are non-transitory.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized this invention is also capable of a wide variety of further and other embodiments within the spirit and scope of the invention. For example, although a number of embodiments shown utilize a common aperture design, it should be noted that the approach and methods for calibration of optical subsystems described herein is not restricted to systems with common apertures and/or entrance pupils, and can be applied to those systems having two or more independent apertures as well. Furthermore, any number of optical elements, reflective or refractive, comprising without limitation refractive, reflective, and/or diffractive elements, can be used in the embodiments of the present invention, and any aspects of the embodiments of the present invention, including but not limited to those shown, can be used in combination with one another as still further embodiments.

The invention claimed is:

1. A calibrated optical system comprising:
   an optical system comprising a detector, enabling measuring input radiance from two different sources;
   a first source;
   said first source positioned in a first spatial location;
   said optical system, when configured to image radiation from the first source onto the detector, providing a first measurement of the input radiance of said first source;
   a second source;
   said second source positioned in a second spatial location;
   said first spatial location and said second spatial location not being a same location;
   said optical system, when configured to image radiation from the second source onto the detector, providing a second measurement of the input radiance of said second source;
   said optical system further providing a third measurement of the input radiance of said second source;
   wherein a radiometric transform is obtained from said first measurement of the input radiance of said first source and said second measurement of the input radiance of said second source;
   said radiometric transform being a linear transform between two spaces; said radiometric transform comprising a linear ratio term and an offset term;
   a processor;
   said processor providing a simulated fourth measurement of the input radiance of said first source by applying said radiometric transform to said third measurement of the input radiance of said second source.

2. The calibrated optical system of claim 1 where the first source is a blackbody source.

3. The calibrated optical system of claim 2 where the second source is a blackbody source.

4. The calibrated optical system of claim 1 wherein said optical system comprises:
   a first optical subsystem configured to receive electromagnetic radiation from said first source;
   a second optical subsystem configured to receive electromagnetic radiation from said second source;
   a third optical subsystem;
   a configurable beam directing device disposed in an optical path of said first optical subsystem and in an optical path of said second optical subsystem; said configurable beam directing device being configurable to be in one of two configurations; when said configurable beam directing device is in a first one of the two configurations, said first optical subsystem provides a portion of the electromagnetic radiation from said first source to said third optical subsystem;
   when said configurable beam directing device is in a second one of the two configurations, said second optical subsystem provides a portion of the electromagnetic radiation from said second source to said third optical subsystem.

5. The calibrated optical system of claim 4 wherein said first optical subsystem comprises at least one reflective element.

6. The calibrated optical system of claim 4 wherein said second optical subsystem comprises at least one reflective element.

7. A calibrated optical system comprising:
an optical system comprising a detector, said detector enabling measuring input radiance from two different sources;
a first source;
said first source positioned in a first spatial location external to said optical system;
said optical system, when configured to image radiation from the first source onto the detector, providing at least one measurement of the input radiance of said first source;
a second source;
said second source positioned in a second spatial location internal to said optical system;
said optical system, when configured to image radiation from the second source onto the detector, providing at least one measurement of the input radiance of said second source;
wherein a radiometric transform is obtained from said at least one measurement of the input radiance of said first source and said at least one measurement of the input radiance of said second source;
said optical system further providing a second measurement of the input radiance of said second source;
a processor;
said processor providing a simulated second measurement of the input radiance of said first source by applying said radiometric transform to said second measurement of the input radiance of said second source.

8. The calibrated optical system of claim 7 where the first source is a blackbody source.

9. The calibrated optical system of claim 7 where the second source is a blackbody source.

* * * * *